US012759810B2

(12) United States Patent
Saslaw et al.

(10) Patent No.: US 12,759,810 B2
(45) Date of Patent: Oct. 13, 2026

(54) OBJECT PROCESSING SYSTEMS AND METHODS WITH PICK VERIFICATION

(71) Applicant: Berkshire Grey Operating Company, Inc., Bedford, MA (US)

(72) Inventors: Jeremy Saslaw, Cambridge, MA (US); Abhijeet Tallavajhula, Malden, MA (US); Vitalii Russinkovskii, Lexington, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 333 days.

(21) Appl. No.: 18/218,316

(22) Filed: Jul. 5, 2023

(65) Prior Publication Data

US 2024/0010445 A1 Jan. 11, 2024

Related U.S. Application Data

(60) Provisional application No. 63/358,302, filed on Jul. 5, 2022.

(51) Int. Cl.
*B25J 9/16* (2006.01)
*B25J 9/00* (2006.01)
*B65G 47/90* (2006.01)

(52) U.S. Cl.
CPC .......... *B65G 47/905* (2013.01); *B25J 9/0093* (2013.01); *B25J 9/1697* (2013.01); (Continued)

(58) Field of Classification Search
USPC .................................................. 700/245–264
See application file for complete search history.

(56) References Cited

U.S. PATENT DOCUMENTS 7,937,913 B2 * 5/2011 Schill .................. G01G 15/001 53/502
8,851,275 B2 10/2014 Tsai
(Continued)

FOREIGN PATENT DOCUMENTS

CN 119486822 A 1/1990
CN 118984802 A 11/2024
(Continued)

OTHER PUBLICATIONS

Notification of Transmittal of the International Search Report and the Written Opinion of the International Searching Authority along with the International Search Report and the Written Opinion of the International Searching Authority (the European Patent Office) issued in related International Application No. PCT/US2023/026911 on Jan. 8, 2024, 21 pages.
(Continued)

*Primary Examiner* — Jonathan L Sample
(74) *Attorney, Agent, or Firm* — Gesmer Updegrove LLP

(57) ABSTRACT

An object processing system including an input area for receiving a plurality of objects to be processed, an output area including a plurality of destination containers for receiving any of the plurality of objects, a programmable motion device proximate the input area and the output area, the programmable motion device including an end-effector for grasping a selected object of the plurality of objects, and a perception system for detecting the unexpected appearance of any of the plurality of objects that is not associated with the end-effector of the programmable motion device.

23 Claims, 16 Drawing Sheets

(52) U.S. Cl.
CPC ................ *B65G 2203/0216* (2013.01); *B65G 2203/0233* (2013.01); *B65G 2203/0258* (2013.01); *B65G 2203/041* (2013.01)

(56) References Cited

U.S. PATENT DOCUMENTS

| | | | | |
|---|---|---|---|---|
| 9,604,258 | B2 * | 3/2017 | Layne | B65G 21/14 |
| 10,549,928 | B1 * | 2/2020 | Chavez | B65G 47/905 |
| 12,269,681 | B2 * | 4/2025 | Long | B65G 1/0485 |
| 12,314,280 | B2 * | 5/2025 | Hattabaugh | G06F 9/451 |
| 2008/0060916 | A1 | 3/2008 | Whittlesey | |
| 2010/0018836 | A1 * | 1/2010 | Kikkawa | B23Q 11/0075 409/137 |
| 2011/0005894 | A1 * | 1/2011 | Tsai | B65H 26/00 198/358 |
| 2017/0057092 | A1 * | 3/2017 | Ito | B25J 9/1679 |
| 2017/0129707 | A1 * | 5/2017 | Nakamoto | B65G 47/912 |
| 2017/0203865 | A1 * | 7/2017 | Kalany | B65B 35/36 |
| 2017/0322561 | A1 * | 11/2017 | Stiernagle | G06Q 10/0875 |
| 2018/0079082 | A1 * | 3/2018 | Takahashi | B25J 9/1697 |
| 2018/0127219 | A1 * | 5/2018 | Wagner | B65G 47/40 |
| 2018/0257225 | A1 * | 9/2018 | Satou | B25J 9/161 |
| 2018/0362270 | A1 * | 12/2018 | Clucas | B25J 5/00 |
| 2019/0152634 | A1 * | 5/2019 | Almogy | B65B 25/04 |
| 2019/0185267 | A1 * | 6/2019 | Mattern | B65B 5/10 |
| 2020/0151408 | A1 * | 5/2020 | Wagner | B65G 25/04 |
| 2020/0151409 | A1 * | 5/2020 | Wagner | B07C 5/36 |
| 2020/0160011 | A1 * | 5/2020 | Wagner | B07C 5/342 |
| 2020/0363259 | A1 * | 11/2020 | Bergstra | G01G 23/36 |
| 2021/0046646 | A1 * | 2/2021 | Prechtl | B25J 9/1615 |
| 2022/0016779 | A1 * | 1/2022 | Wang | G06N 3/0464 |
| 2022/0088778 | A1 * | 3/2022 | Sun | B25J 9/0093 |
| 2022/0134543 | A1 * | 5/2022 | Amend, Jr. | B25J 9/1602 700/245 |
| 2022/0135329 | A1 * | 5/2022 | Cohen | B25J 9/0093 700/216 |
| 2022/0138214 | A1 * | 5/2022 | Hattabaugh | G06F 9/451 707/600 |
| 2022/0288787 | A1 * | 9/2022 | Dupree | B25J 9/1687 |
| 2022/0297958 | A1 * | 9/2022 | Moreno | B25J 13/08 |
| 2022/0315352 | A1 * | 10/2022 | Sun | B65G 47/69 |
| 2022/0315358 | A1 * | 10/2022 | Ryan | B25J 9/1697 |
| 2022/0324658 | A1 * | 10/2022 | Cedarleaf-Pavy | B65G 47/44 |
| 2022/0334560 | A1 * | 10/2022 | Lovett | B25J 9/1697 |
| 2022/0402708 | A1 * | 12/2022 | Pidaparthi | B25J 9/1669 |
| 2022/0402709 | A1 * | 12/2022 | Pidaparthi | B25J 9/1661 |
| 2022/0405439 | A1 * | 12/2022 | Pidaparthi | G06F 30/20 |
| 2023/0303338 | A1 | 9/2023 | Williams et al. | |
| 2023/0331498 | A1 * | 10/2023 | Hau | B65G 61/00 |

FOREIGN PATENT DOCUMENTS

| | | | |
|---|---|---|---|
| EP | 0124177 | A1 | 11/1984 |
| WO | 2011021056 | A1 | 2/2011 |
| WO | 2017096021 | A1 | 6/2017 |
| WO | 2018175717 | A1 | 3/2018 |
| WO | 2021252073 | A1 | 12/2021 |
| WO | 2023183492 | A1 | 9/2023 |
| WO | 2024010796 | A2 | 1/2024 |

OTHER PUBLICATIONS

International Preliminary Report on Patentability issued by the International Bureau of WIPO in related International Application No. PCT/US2023/016087 on Sep. 24, 2024, 9 pages.

International Preliminary Report on Patentability issued by the International Bureau of WIPO in related international application No. PCT/US2023/026911 on Dec. 18, 2024, 12 pages.

Notification of Transmittal of the International Search Report and The Written Opinion of the International Searching Authority (the European Patent Office) and the International Search Report and Written Opinion of the International Searching Authority issued in related International Application No. PCT/US2023/016087 on Sep. 13, 2023, 15 pages.

* cited by examiner

OBJECT PROCESSING SYSTEMS AND METHODS WITH PICK VERIFICATION

PRIORITY

The present application claims priority to U.S. Provisional Patent Application No. 63/358,302 filed Jul. 5, 2022, the disclosure of which is hereby incorporated by reference in its entirety.

BACKGROUND

The invention generally relates to object processing systems, and relates in particular to object processing systems such as automated storage and retrieval systems, distribution center systems, and sortation systems that are used for processing a variety of objects.

Current object processing systems generally involve the processing of a large number of objects, where the objects are received in either organized or disorganized batches, and must be routed to desired destinations in accordance with a manifest or specific addresses on the objects (e.g., in a mailing system).

Automated storage and retrieval systems (AS/RS), for example, generally include computer-controlled systems for automatically storing (placing) and retrieving objects from defined storage locations. Traditional AS/RS typically employ totes (or bins), which are the smallest unit of load for the system. In these systems, the totes are brought to people who pick individual objects out of the totes. When a person has picked the required number of objects out of the tote, the tote is then re-inducted back into the AS/RS.

Current distribution center sorting systems, for example, generally assume an inflexible sequence of operations whereby a disorganized stream of input objects is first singulated into a single stream of isolated objects presented one at a time to a scanner that identifies the object. An induction element (e.g., a conveyor, a tilt tray, or manually movable bins) transport the objects to the desired destination or further processing station, which may be a bin, an inclined shelf, a chute, a bag or a conveyor, etc.

In typical parcel sortation systems, human workers or automated systems typically retrieve parcels in an arrival order, and sort each parcel or object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin. If the number of different types of input (received) objects is large, a large number of collection bins is required.

Automated processing systems may employ programmable motion devices such as robotic systems that grasp and move objects from one location to another (e.g., from a tote to a destination container). During such grasping and movement however, there is a potential for errors, such as for example, more than one object being picked, an object being picked that is below other objects (which may then be ejected from a tote), and an object(s) being dropped or knocked from the end-effector of the robotic system. Any of these events could potentially cause errors in the automated processing systems.

Adding to these challenges are the conditions that some objects may have information about the object entered into the manifest or a shipping label incorrectly. For example, if a manifest in a distribution center includes a size or weight for an object that is not correct (e.g., because it was entered manually incorrectly), or if a shipping sender enters an incorrect size or weight on a shipping label, the processing system may reject the object as being unknown. Additionally, and with regard to incorrect information on a shipping label, the sender may have been undercharged due to the erroneous information, for example, if the size or weight was entered incorrectly by the sender.

There remains a need for more efficient and more cost-effective object processing systems that process objects of a variety of sizes and weights into appropriate collection bins or boxes, yet is efficient in handling objects of such varying sizes and weights.

SUMMARY

In accordance with an aspect, the invention provides an object processing system including an input area for receiving a plurality of objects to be processed, an output area including a plurality of destination containers for receiving any of the plurality of objects, a programmable motion device proximate the input area and the output area, the programmable motion device including an end-effector for grasping a selected object of the plurality of objects, and a perception system for detecting the unexpected appearance of any of the plurality of objects that is not associated with the end-effector of the programmable motion device.

In accordance with another aspect, the invention provides an object processing system including an input area for receiving a plurality of objects to be processed, the input area including a weight sensing conveyor section and the plurality of objects being provided within at least one input container, an output area including a plurality of destination containers for receiving any of the plurality of objects, a programmable motion device proximate the input area and the output area, the programmable motion device including an end-effector for grasping any of the plurality of objects, and a perception system for detecting whether any of the plurality of objects on the weight sensing conveyor section are not within the at least one input container on the weight sensing conveyor section.

In accordance with a further aspect, the invention provides an object processing system including an input area for receiving a plurality of objects to be processed, an output area including a plurality of destination containers for receiving any of the plurality of objects, a programmable motion device proximate the input area and the output area, the programmable motion device including an end-effector for grasping any of the plurality of objects, and a perception system including at least one camera system and a plurality of scanning systems for detecting any identifying indicia on any of the plurality of objects that fall toward a portion of a floor of the object processing system as well as for detecting a number of any of the plurality of objects that fall toward the floor of the portion of the object processing system.

In accordance with yet a further aspect, the invention provides a method of processing objects including providing a plurality of objects in a container on a weight sensing conveyor section, grasping a selected object of the plurality of objects for movement to a destination container using a programmable motion device, and monitoring whether any of the plurality of objects other than the selected object become dropped or displaced using a perception system and weight sensing conveyor sections.

BRIEF DESCRIPTION OF THE DRAWINGS

The following description may be further understood with reference to the accompanying drawings in which.

The drawings are shown for illustrative purposes only

DETAILED DESCRIPTION

The invention provides an efficient and economical object processing system that may be used, for example, to provide any of shipping orders from a wide variety of objects, groupings of objects for shipping purposes to a variety of locations, and locally specific groupings of objects for collection and shipment to a large location with locally specific areas such as product isles in a retail store. Each of the systems may be designed to meet Key Performance Indicators (KPIs), while satisfying industrial and system safety standards.

Figure 1:
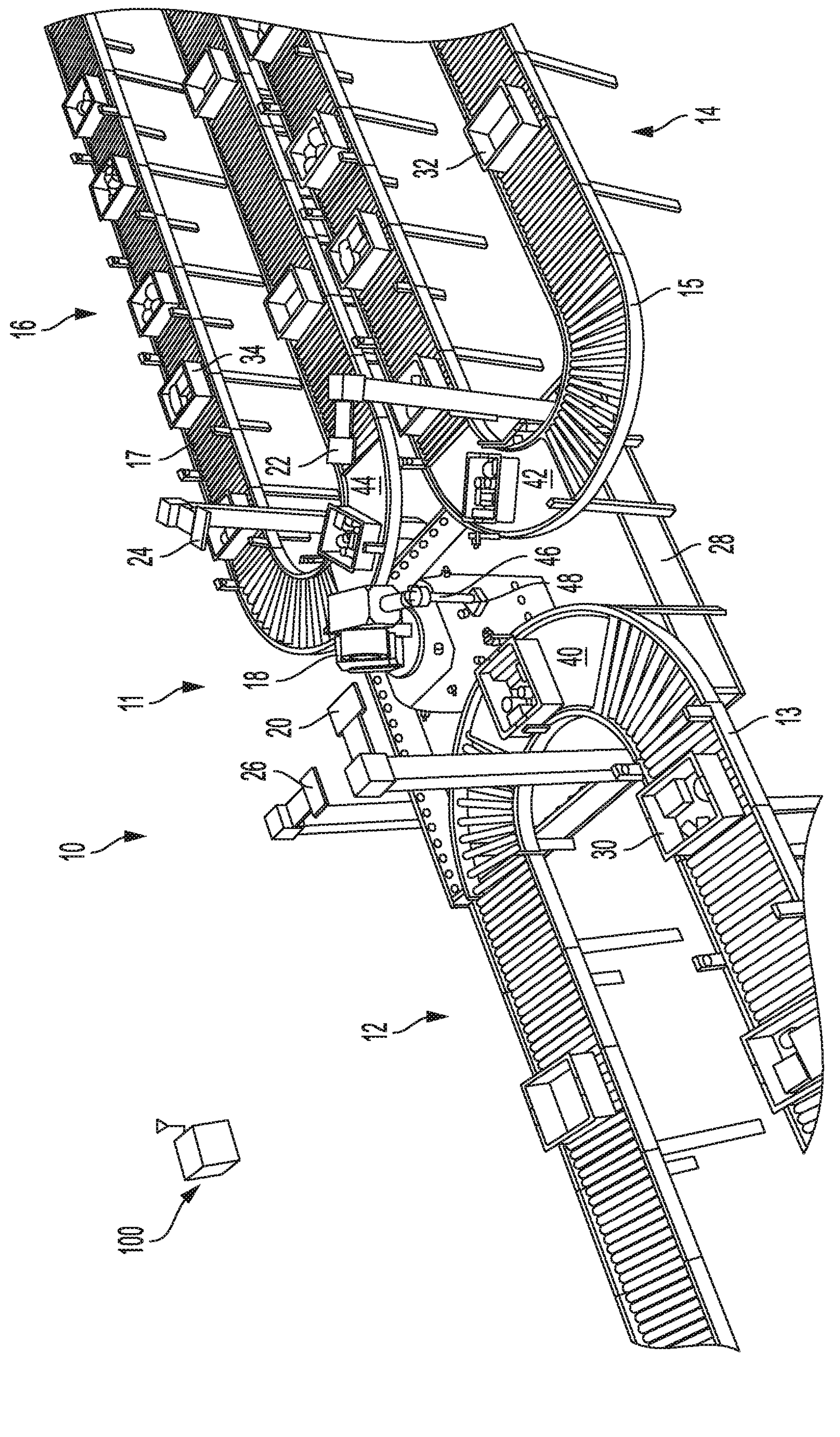
FIG. 1 shows an illustrative diagrammatic view of an object processing system in accordance with an aspect of the present invention.

In accordance with an aspect, the system provides an object processing system that maintains knowledge of objects as they are processed, the knowledge including a number of objects picked, whether any objects are dropped or displaced, which objects are dropped or displaced, and how the objects became dropped or displaced. FIG. 1 shows an object processing system 10 that includes an input conveyance system 12, an object processing station 11, and two output conveyance systems 14, 16. Positioned between the conveyance systems 12, 14, 16 is a programmable motion device 18 such as an articulated arm robotic system with an end-effector (e.g., a vacuum end-effector including a vacuum cup). The input conveyance system 12 includes a weight sensing belted conveyor section 40, and the output conveyance systems 14, 16 also each include a weight sensing belted conveyor section 42, 44 respectively.

The system 10 also includes a plurality of upper perception units 20, 22, 24, 26 as well as a floor-based catch bin 28. Input objects arrive in input containers 30 on an input conveyor 13 of the input conveyance system 12, and are provided by the programmable motion device 18 to either destination containers 32 on an output conveyor 15 of the output conveyance system 14 or to destination containers 34 on an output conveyor 17 of the output conveyance system 16. Operation of the system, including the conveyance systems 12, 14, 16, all perception systems (including perception units 20, 22, 24,26 and weight sensing belted conveyor sections 40, 42, 44) and the programmable motion device is provided by one or more computer processing systems 100. In accordance with various aspects, any of roller conveyors, belted conveyors and other conveyance systems (e.g., moving plates) may all include weight sensing capabilities by being mounted on load cells or force torque sensors in accordance with aspects of the present invention.

Figure 2A:
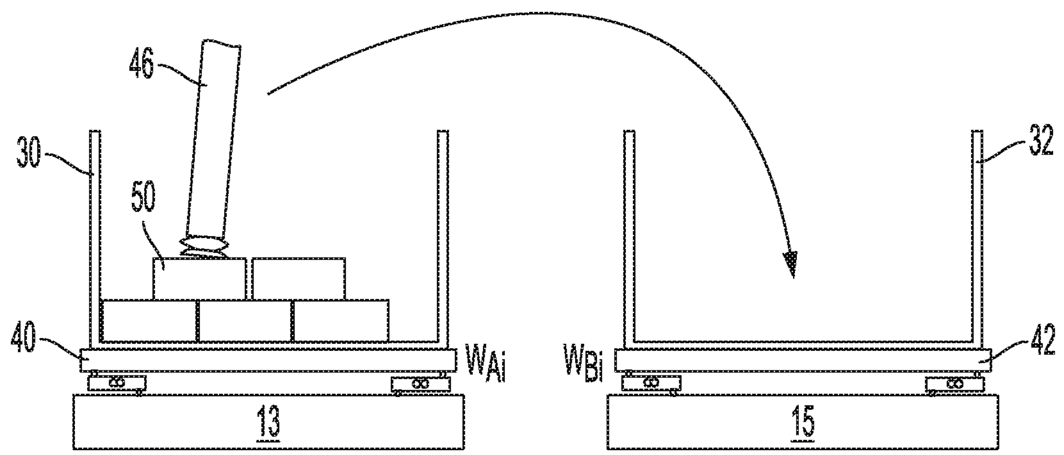
FIGS. 2A and 2B show illustrative diagrammatic side views of an object being transferred from one container to another in accordance with an aspect of the present invention.
Figure 2B:
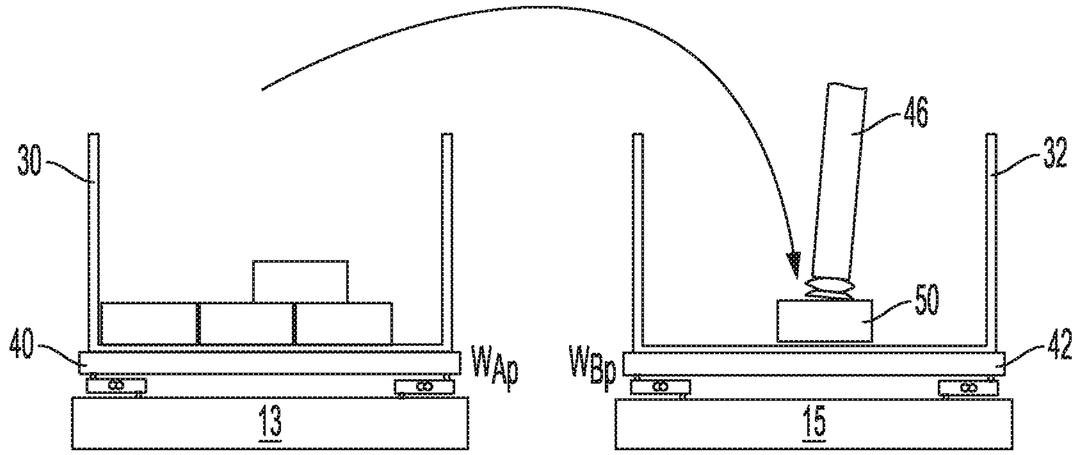

A goal of the system is to accurately and reliably move objects from an input container 30 to any of destination containers 32, 34 using, for example, the end-effector 46 with a vacuum cup 48. As discussed in more detail herein the system employs a robust set of perception processes that use weight sensing, imaging and scanning to maintain knowledge of locations of all objects at all times. With reference to FIGS. 2A and 2B, following the transfer of an object 50 from the input container 30 (FIG. 2A) to the output container 32, an initial weight of the input container 30 prior to transfer ($W_{Ai}$) plus an initial weight of the output container 32 prior to transfer ($W_{Bi}$), should equal the weight of the input container 30 post transfer ($W_{Ap}$) (FIG. 2B) plus the weight of the output container 32 prior to transfer ($W_{Bp}$). This employs the principle of conservation of mass when the object 50 is transferred to the container 32.

In accordance with an aspect of the invention, the system may take an initial weight measurement immediately prior to an event (either a pick or a placement) and then wait a buffer period of time prior to taking a post event weight measurement. The buffer period of time may be, for example, 1, 1.5, 2, 2.5, 3 or 5 seconds, to permit any forces applied to the bin during pick or placement by the end-effector to not alter the post event weight measurement.

Figure 3:
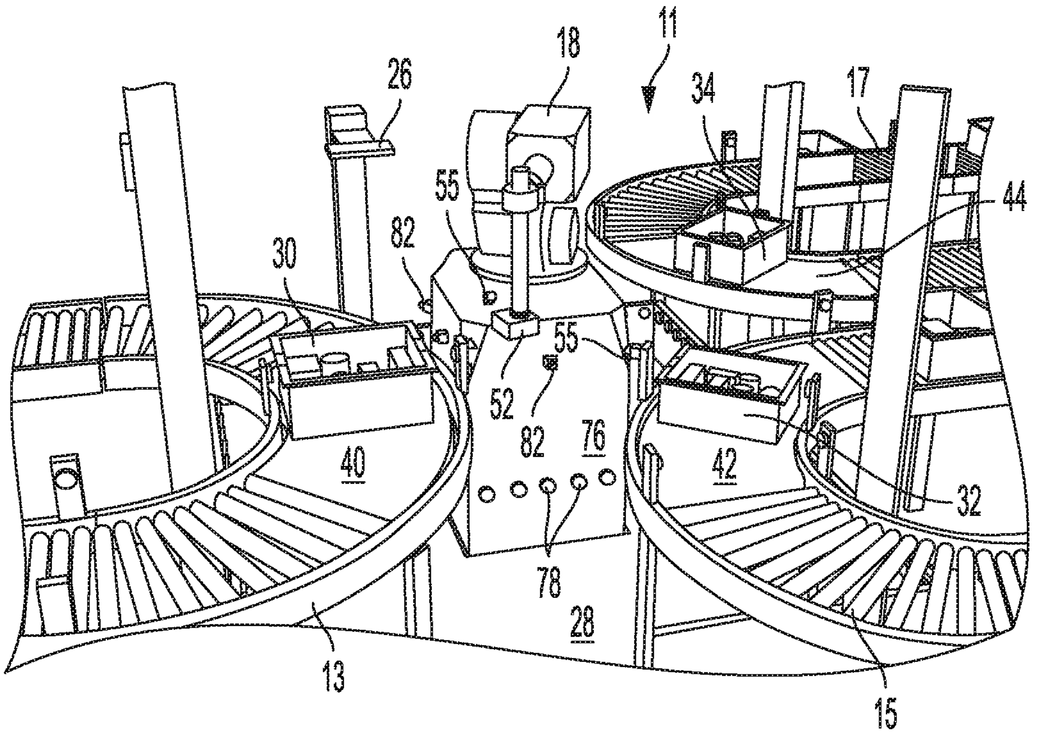
FIG. 3 shows an illustrative diagrammatic view of the object processing system of FIG. 1 with an object positioned at a pose-in-hand location.
Figure 4:
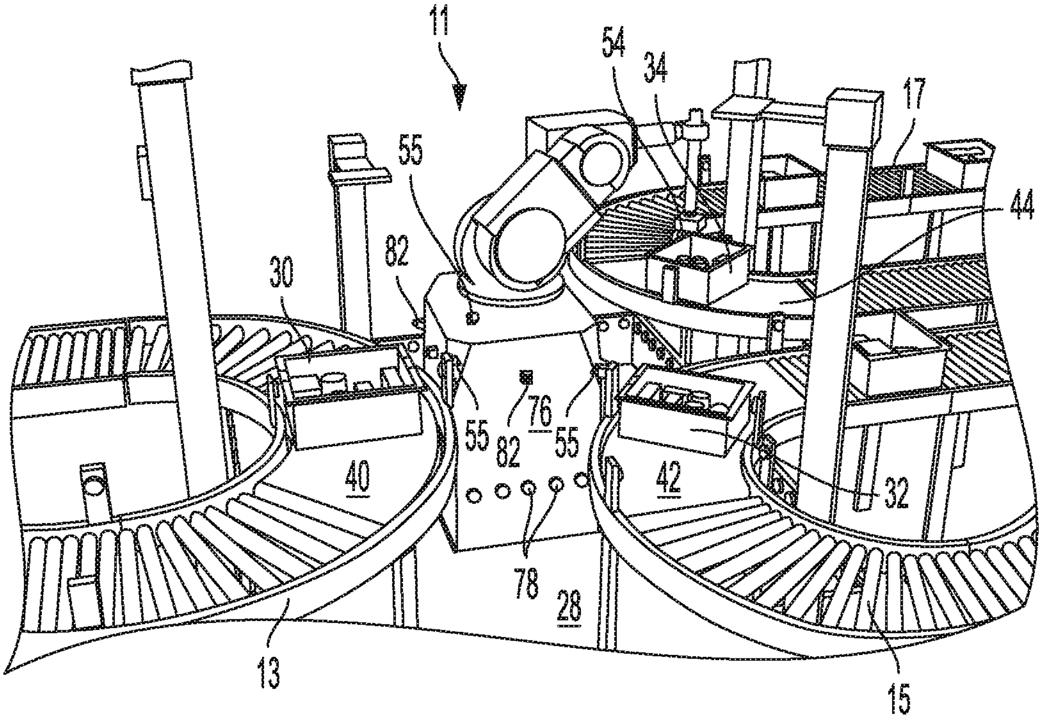
FIG. 4 shows an illustrative diagrammatic view of the object processing system of FIG. 1 with the object deposited into a container on a weight sensing conveyor belted system of FIG. 1.

FIG. 3 shows an object 52 at a pose-in-hand location at the object processing station 11 on its way to be moved to the container 32 on the weight sensing belted conveyor section 42. All transfers may involve moving the end-effector to the pose-in-hand location (with or without a stop) and pose-in-hand cameras 55 may be directed at any object held by the end-effector at the pose-in-hand location. FIG. 4 shows an object 54 being moved to the container 34 on the weight sensing belted conveyor section 44 at the object processing station 11. Each time an object is moved from the source location (location A) the system confirms that the correct object is grasped and lifted to a pose-in-hand location (e.g., as shown in FIG. 1). The pose-in-hand location is a location (typically near the input conveyance system) at which the pose (location and orientation) of an object on the gripper is determined (e.g., by a plurality of perception systems). The pose-in-hand location may also be chosen such that upper cameras have unobstructed views (unobstructed by the programmable motion device) of the weight sensing belted conveyors as discussed in more detail below with reference to FIGS. 9A and 9B. The system then moves the object to the destination location (location B) and confirms that the object is received at the destination location. Objects that fall onto any of the weight sensing belted conveyor sections 40, 42, 44 or the roller conveyors of conveyance systems 12, 14, 16 generally if mounted on load cells or force torque sensors are detected as discussed in more detail below, and objects that fall into the floor-based catch bin 28 are also detected as also discussed in more detail below. Objects may become dropped or displaced, for example, by any of a drop, a multi-pick, or grasp and lift operation that causes other objects to be lifted out of an input container 30 along with a selected object.

While a reading of the stable state mass on the pick conveyor is typically taken at some time X before the robot's anticipated impact with the pick container, it is possible due to imperfect approximations of motion, or because the objects in the tote may still be dynamically moving from a previous action, that the system isn't truly in a steady state at this expected time X. As such, techniques can take place where after time X, based on the readings that come in thereafter, such a new reading may be considered if the new reading at time X+T is more accurate for the steady state system mass prior to impact. Specifically, one such approach considers all readings between time X, and the time that the robot is sensed to have made impact with the object it is picking, and a minimum reading among this time span is utilized. This is most useful in the example where a rapid retry takes place. A rapid retry is where the robot attempts to pick an object A, fails to acquire a grasp on it, and then rapidly retries to pick an object B. The time span between attempt A and B is generally very fast, so the weighing scale may not have come to rest (and may have a positive spike in mass) at time X before attempt B, as a result of the robot's interference with the container from attempt A. As such, minimizing the readings from the timed callback before pick B, until pick B occurs, resolves this issue for finding the stable reading before pick B.

Figure 8:
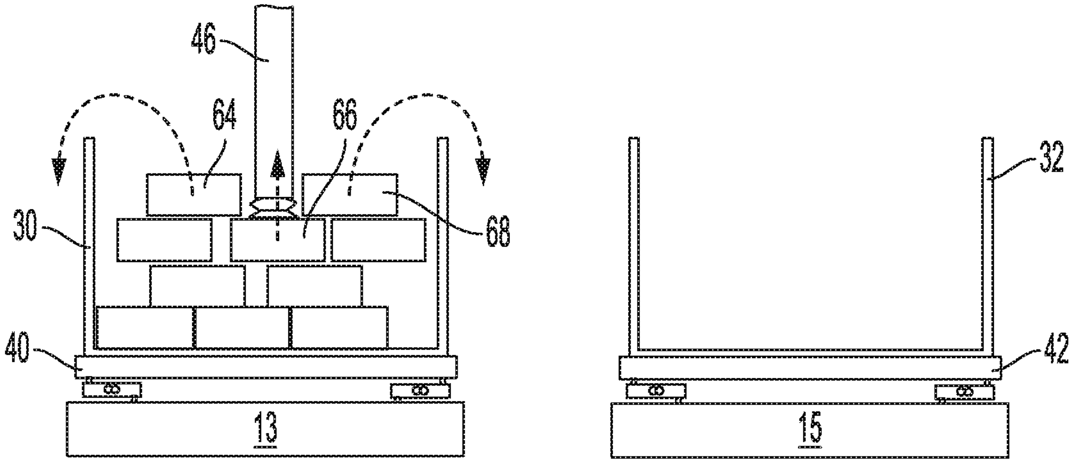
FIG. 8 shows an illustrative diagrammatic side view of an object being transferred from one container to another in accordance with an aspect of the present invention wherein an object has been lifted causing discharge of other objects.

In accordance with further aspects, systems of the invention may employ continuous-movement object detection. In order to minimize the time it takes to detect that an undesirable amount of objects has/have been picked, continuous detection after the robot has picked an object, and whilst the robot is moving, can take place to regularly check for detection of an undesirable amount of objects having been picked. The benefit to doing so is such that an undesirable amount of objects being picked can be detected as quickly as possible. In detecting this sooner, the robot can be told to stop sooner, which improves system speed. Additionally, as seen in FIG. 8, an undesirable pick may involve objects being retracted out of the container by the robot in an unstable manner—for example objects 64 and 68 may be lifted up, and be at risk of falling out of the container. As such, detecting this undesirable pick as soon as possible means minimizing the risk of losing such objects outside of the container.

In order to detect an undesirable pick whilst the robot is moving (and whilst objects within the pick container may be shuffling as a result of a pick), careful algorithmic techniques are derived which balance detecting an undesirable pick as soon as possible, while not introducing false positives. A false positive is defined such that the system believes an undesirable pick takes place, whereas in reality a valid pick occurred. The risk of a false positive exists due to the dynamics of a real-world system where objects may shuffle and move in a non-uniform manner while the robot picks up one or more objects.

This continuous detection whilst the system is in a dynamic state can take many forms, but a non-limiting list of examples are provided herein. A clearance time may be used, such that while detecting for an invalid mass difference, such mass difference must remain above the provided threshold for the specified clearance time. This technique helps to mitigate false beliefs of quantity of objects picked as a result of spikes (sudden changes) in mass as a result of objects toppling over, hitting walls of the container, etc., while the robot performs a pick and a retract. Additionally, an affirming approach may take place such that if the mass difference registered is considered invalid, and the difference remains within a stability limit for a specified amount of stability time, then it can be believed that the system has reached steady state and a determination can be made immediately at that time.

In particular, FIGS. 5A-5G show detailed steps of a process for moving an object from Bin A to Bin B (e.g., from bin 30 to bin 32 or from bin 30 to bin 34). The process begins (step 1000) by determining the weight of the weight sensing belted conveyor section A (e.g., section 40). As further shown in FIGS. 9A and 9B, the rollers in weight sensing belted conveyor section 40 may be mounted on load cells or force torque sensors and may be covered by an elastomeric belt. Further, the rollers of the conveyance systems 12, 14, 16 outside of the belted conveyor sections 40, 42, 44 may also be mounted on load cells or force torque sensors for weight sensing. A weight for the entire section (e.g., 40) is determined (step 1002), which includes the input bin (e.g., 30) as well as all contents therein. Where individual rollers have weight sensing capabilities, each weight sensing system specific to each roller is zeroed out to adjust for the weight of the associated roller. Any portion of a bin on such a roller would be reduced from the after-pick weight measurement to confirm an object pick. The system then grasps and lifts a selected object from bin A (step 1004), and then again determines a weight of the conveyor section A (step 1006). The system has information regarding each of the objects, including an expected weight of the selected object. The system has previously recorded the weight of the conveyor and bin prior to the pick. From steps 1002 and 1006, the system determines a weight pick delta, the difference in weight before and after the pick, which represents a weight that has (presumably) been removed from the bin A. If the weight pick delta is within a tolerance (e.g., 3% or 5%) of the expected weight of the selected object, then the system continues to step 1010. If not, the process moves to FIG. 5E as indicated and discussed below.

If the weight pick delta for grasping and lifting the selected object is within tolerance, then the system determines whether the camera system has detected any new object(s) that are not associated with the end-effector (step 1010). In particular, the upper camera system may run continuous background subtraction to identify consecutive pairs of images that are different. The consecutive images may be taken for example, 0.5, 1, 3 or 5 seconds apart. The images may be taken continuously or performed at discrete times, performing background subtraction on each consecutive pair of images, discounting any changes associated with movement of the end-effector. The object detection analysis is discussed in more detail below with reference to FIGS. 9A and 9B. The upper camera system may include a plurality of cameras at the upper perception units 20, 22, 24, 26. If the camera system does detect new object(s) that are not associated with the end-effector, the process moves to FIG. 5G as indicated and discussed below.

Figure 5A:
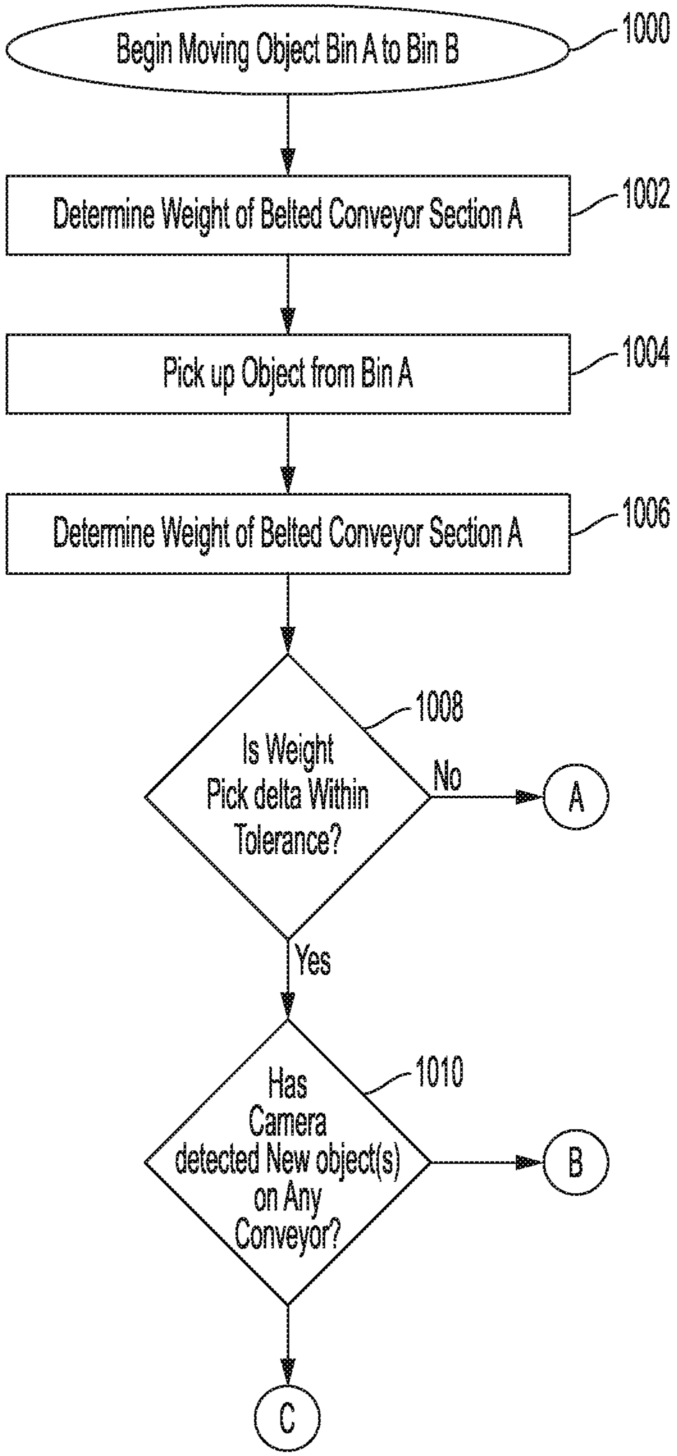
FIGS. 5A-5G show illustrative diagrammatic views of processing steps in a processing system in accordance with an aspect of the present invention.
Figure 5B:
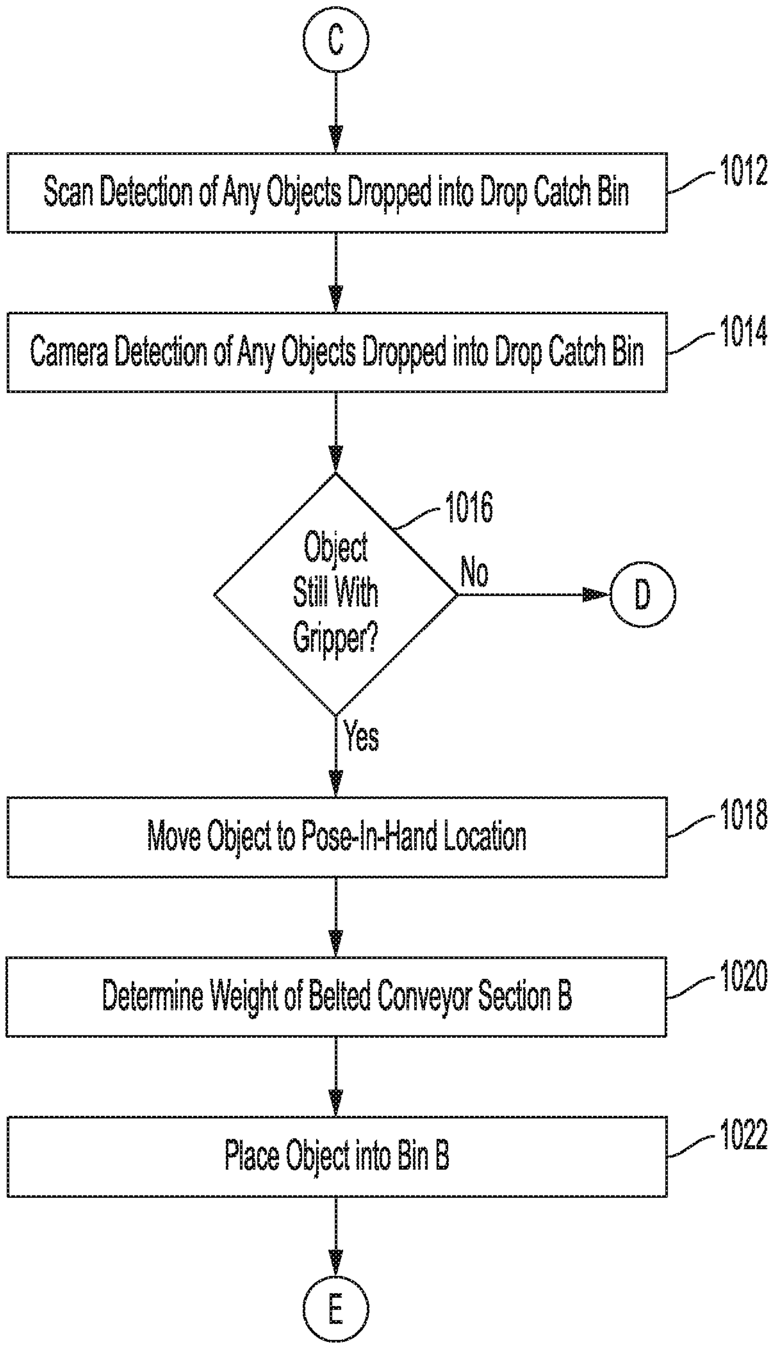
Figure 5C:
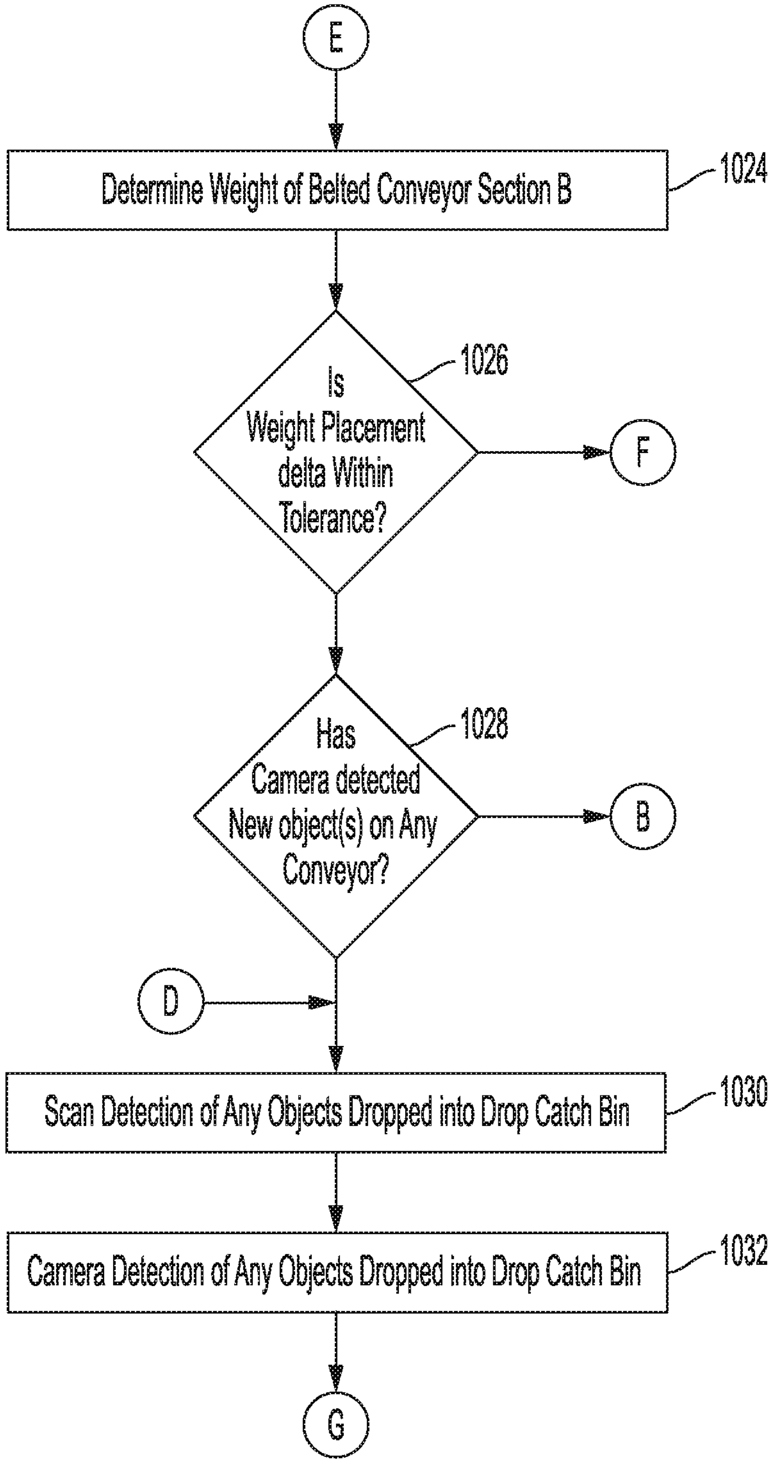

If the system has not detected any new object(s) that are not associated with the end-effector, the process moves to FIG. 5B as indicated and the system reviews all recent scans by the lower scanning units 60 in the floor-based catch bin 28 (step 1012). Any identifying indicia on a dropped object may be detected by the scanning units 60, thereby identifying each object that falls into the floor-based catch bin 28. The system then reviews images from each of plural lower camera units 62 that are directed to the floor-based catch bin 28 (step 1014). The camera units 62 are directed toward the inside of the floor-based catch bin 28, thereby identifying or confirming the identity of each object that lies in the floor-based catch bin 28.

The system then confirms (using the upper camera system and/or sensors within the end-effector) that an object is still being grasped by the gripper (step 1016). If not, the process moves to FIG. 5C as indicated and discussed below. The system then moves the object (with the end-effector) to the pose-in-hand location (e.g., as shown in FIG. 1) (step 1018), and then determines a weight of the weight sensing belted conveyor section B (e.g., sections 42 or 44) (step 1020). The object is then placed into bin B (e.g., bin 32 or bin 34) (step 1022) and with reference to FIG. 5C, the system then again determines a weight of the weight sensing belted conveyor section B (step 1024). Again, a weight for the entire section (e.g., 42, 44) is determined (step 1026), which includes the output bin (e.g., 32, 34) as well as all contents therein. Again, the system has information regarding each of the objects, including an expected weight of the selected object. From steps 1020 and 1024, the system determines a weight placement delta that represents a weight that has (presumably) been placed into the bin B. If the weight placement delta is within a tolerance (e.g., 3%, 5% or 10%) of the expected weight of the selected object, then the system continues to step 1028. If not, the process moves to FIG. 5F as indicated and discussed below.

If the weight placement delta for placing the selected object is within tolerance, then the system determines whether the camera system has detected any new object(s) that are not associated with the end-effector (step 1028). Again, the upper camera system may run continuous background subtraction to identify consecutive pairs of images that are different. The consecutive images may be taken for example, 0.5, 1, 3 or 5 seconds apart, and the images may be taken continuously or performed at discrete times, performing background subtraction on each consecutive pair of images, discounting any changes associated with movement of the end-effector. The upper camera system includes the plurality of cameras at the upper perception units 20, 22, 24, 26. If the camera system does detect new object(s) that are not associated with the end-effector, the process moves to FIG. 5G as indicated and discussed below.

If the system has not detected any new object(s) that are not associated with the end-effector (step 1028), then the system reviews all recent scans by the lower scanning units 60 in the floor-based catch bin 28 (step 1030). Any identifying indicia on a dropped object may be detected by the scanning units 60, thereby identifying each object that falls into the floor-based catch bin 28. The system then reviews images from each of plural lower camera units 62 that are directed to the floor-based catch bin 28 (step 1032). The camera units 62 are directed toward the inside of the floor-based catch bin 28, thereby identifying or confirming the identity of each object that lies in the floor-based catch bin 28.

Figure 5D:
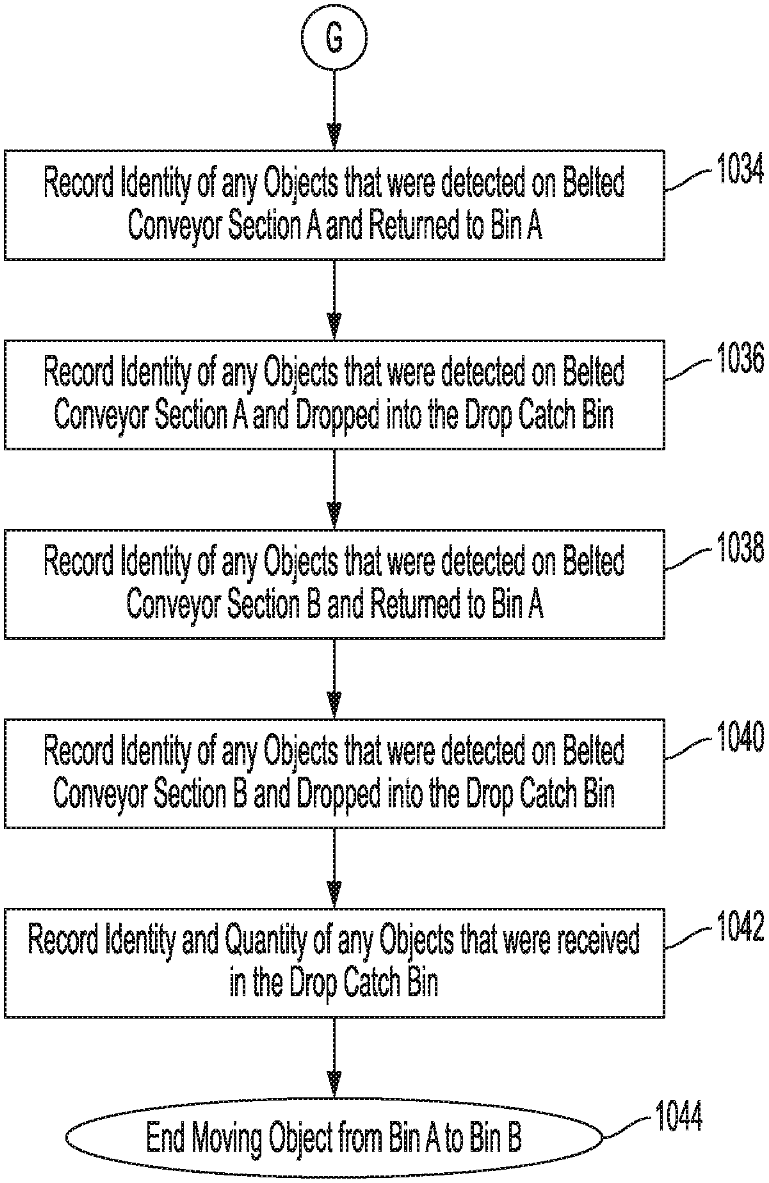

With reference to FIG. 5D, the system then records the identity of any objects that were detected on belted conveyor section A and returned to Bin A (as discussed below) (step 1034). The system then records the identity of any objects that were detected on belted conveyor section A and dropped into the floor-based catch bin (as discussed below) (step 1036). The system then records the identity of any objects that were detected on belted conveyor section B and returned to Bin A (as discussed below) (step 1038), and then records the identity of any objects that were detected on belted conveyor section B and dropped into the floor-based catch bin (as discussed below) (step 1040). The system then records the identity and quantity of any objects that were received by the floor-based catch bin 28 (step 1042), and then ends (step 1044).

Figure 5E:
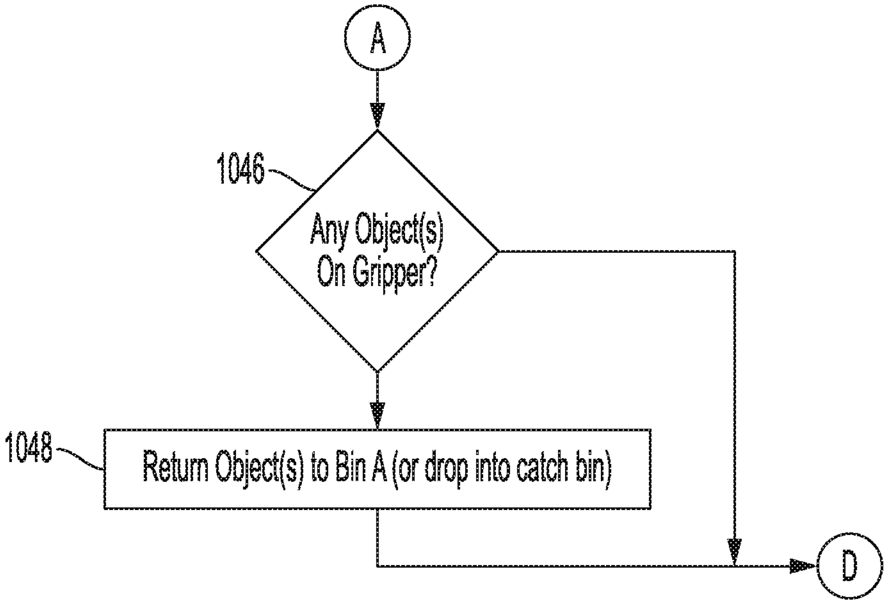
Figure 5F:
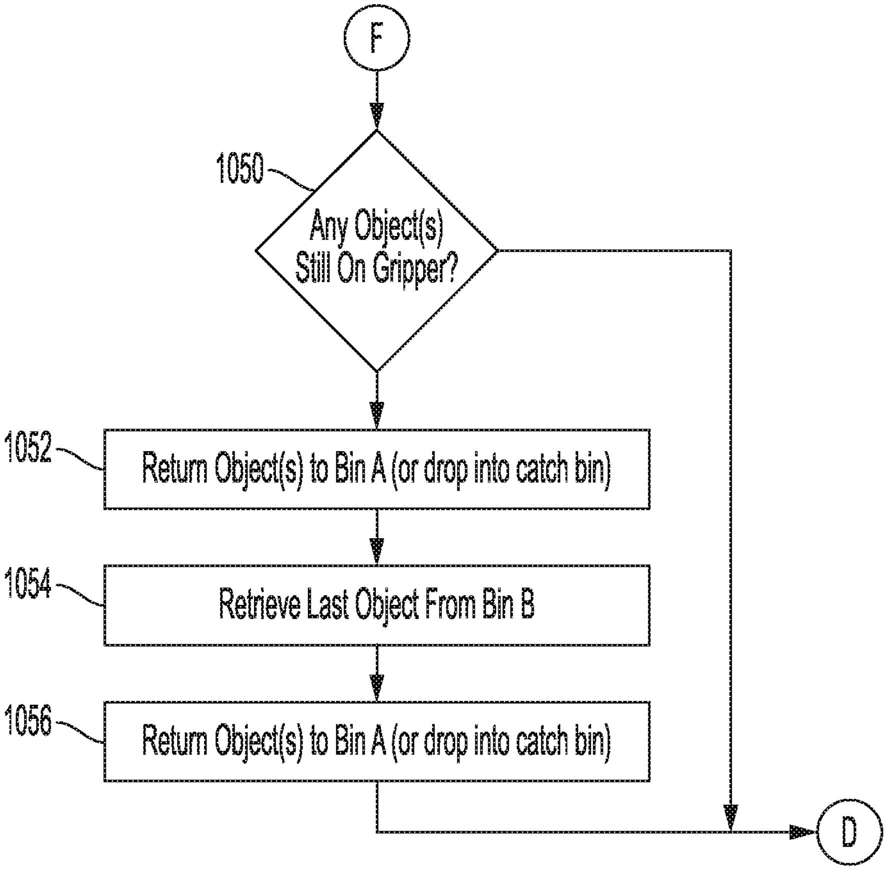
Figure 5G:
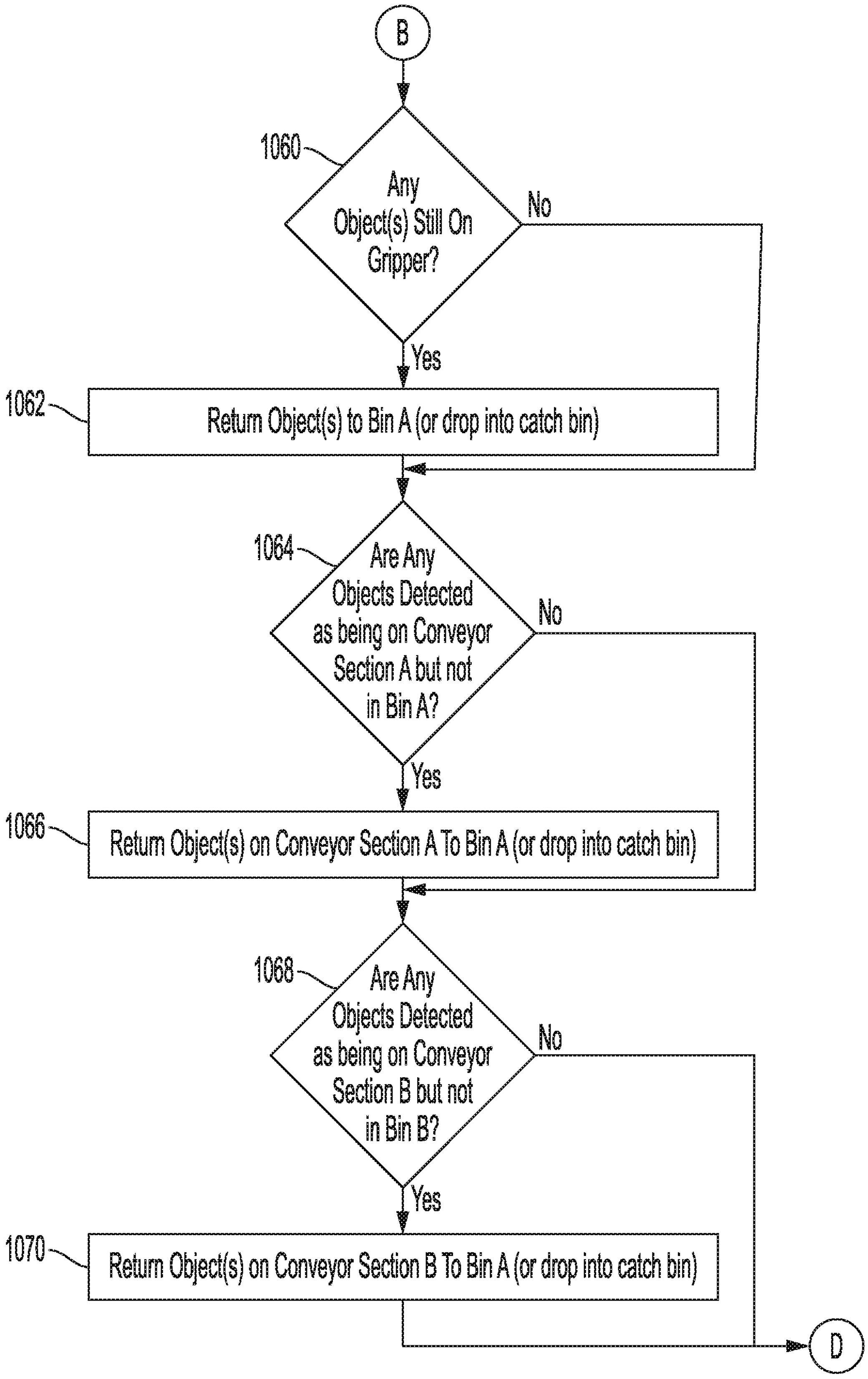

With reference to FIG. 5E, if the system determines that a weight pick delta is not within tolerance (step 1008) in FIG. 5A, then the system determines whether any object is on the gripper (step 1046), and if so, either returns the object to Bin A or drops the object into the floor-based catch bin (step 1048). If the object is returned to Bin A, further attempts to grasp and move the object may be made. If more than a limited number of prior attempts have been made (e.g., 3 or 4), then the system may drop the object into the floor-based catch bin 28. The system then returns to step 1030 in FIG. 5C.

If the system determines that a weight placement delta is not within tolerance (step 1026), then the system determines whether any object is on the gripper (step 1050), and if so, either returns the object to Bin A or drops the object into the floor-based catch bin (step 1052). Again, if the object is returned to Bin A, further attempts to grasp and move the object may be made, and if more than a limited number of prior attempts have been made (e.g., 3 or 4), then the system may drop the object into the floor-based catch bin 28. The system may then retrieve the last object from Bin B (step 1054) and then either return the last object to Bin A or drop the object into the floor-based catch bin (step 1056) as discussed above. The system then returns to step 1030 in FIG. 5C.

If the camera system has detected motion not associated with the motion of the end-effector (steps 1010 or 1028), then the system uses the upper camera system (and or end-effector sensors) to determine whether any object is being held by the gripper (step 1060) as discussed above, and if so, the system either returns the object to bin A or drops the object into the floor-based catch bin (step 1062). The system then determines whether any objects are detected as being on conveyor section A but not in Bin A (step 1064). If so, the system then returns the object or objects on the conveyor section A to Bin A or drops the object(s) into the floor-based catch bin (step 1066). Regardless of whether any object(s) were detected as being on conveyor section A, the system then determines whether any objects are detected as being on conveyor section B but not in Bin B (step 1068). If so, the system then returns the object or objects on the conveyor section A to Bin A or drops the object(s) into the floor-based catch bin (step 1070).

Figure 6A:
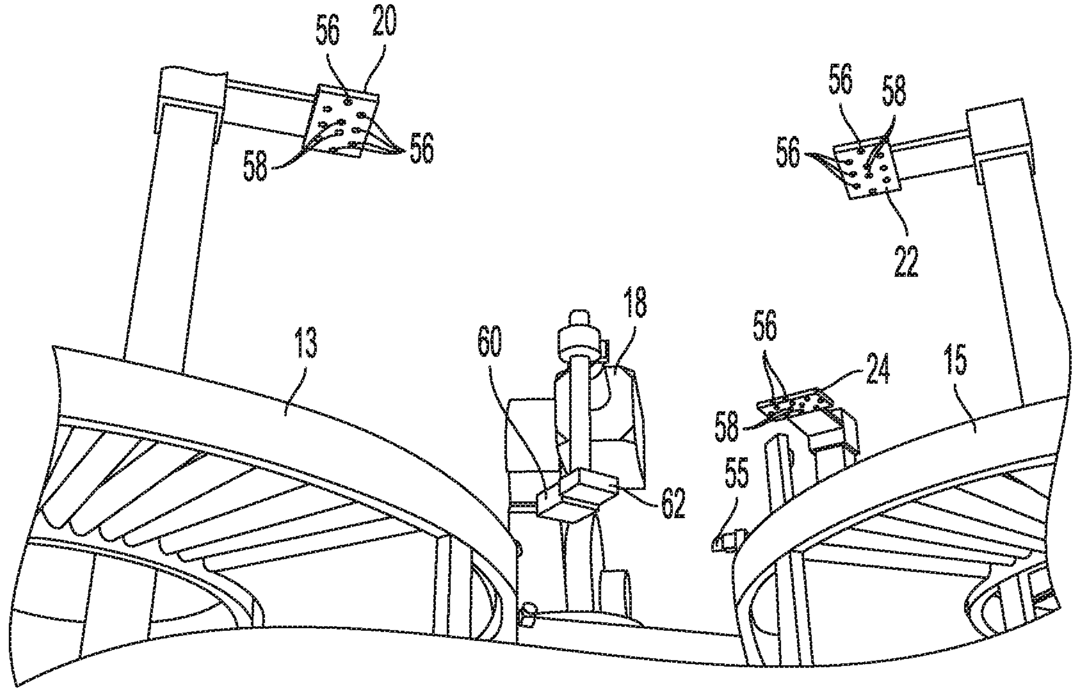
FIGS. 6A and 6B show illustrative diagrammatic underside views of the object processing system of FIG. 1 with the processing station of the system of FIG. 1, showing (FIG. 6A) and showing (FIG. 6B)
Figure 6B:
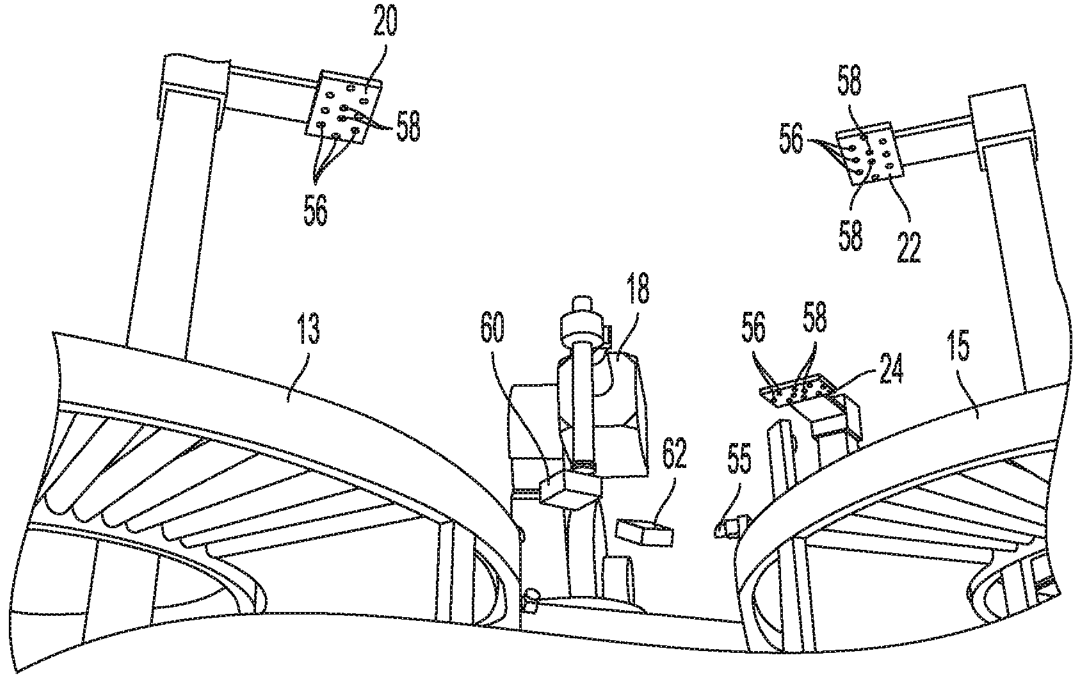

FIGS. 6A and 6B show the upper perception units 20, 22, 24 including both cameras 56 and scanning units 58 directed toward the object processing area. The cameras may be used, in part, to detect movement of an object that is not associated with movement of the end-effector. For example, FIG. 6A shows a multi-pick where both objects 60, 62 have been grasped by the vacuum cup 48 of the end-effector 46. If one object (e.g., 48) is not sufficiently grasped, it may fall during transport (as shown in FIG. 6B). Prior to the object falling, the only motion detected by the cameras 56 is the motion of the end-effector along its trajectory. The scanning units 54 may be used to facilitate capturing any identifying indicia as objects are being processed, or may be 3D scanners for providing volume information regarding volumes of objects within any of the bins 30, 32, 34 during processing.

In accordance with a run-time example therefore, the system may, pick one object of mass 100 g. The system may then measure pick scale 0.4 seconds before impact, receive reading of one kg. The system may then successfully pick the object and move it to a pose-in-hand location. As this motion is occurring, the system periodically receives pick scale readings and fits a model to determine if more than one object has been picked. If a continuous check does not register double pick, the system will reach the pose in hand node, and receive a pick scale reading of 0.895 kg. The system will confirm that 105 g has been removed from the pick tote, which is within threshold of believing we have picked one 100 g object. The system will continue to place the object and do so successfully. The system will then take a place scale reading before the object is placed, say it is at 200 g, and the object is placed and the system will then take another place scale reading, which may read as say 295 g. The system has therefore verified that it has added 95 g to the place box, which is within tolerance of one 100 g object.

Figure 7:
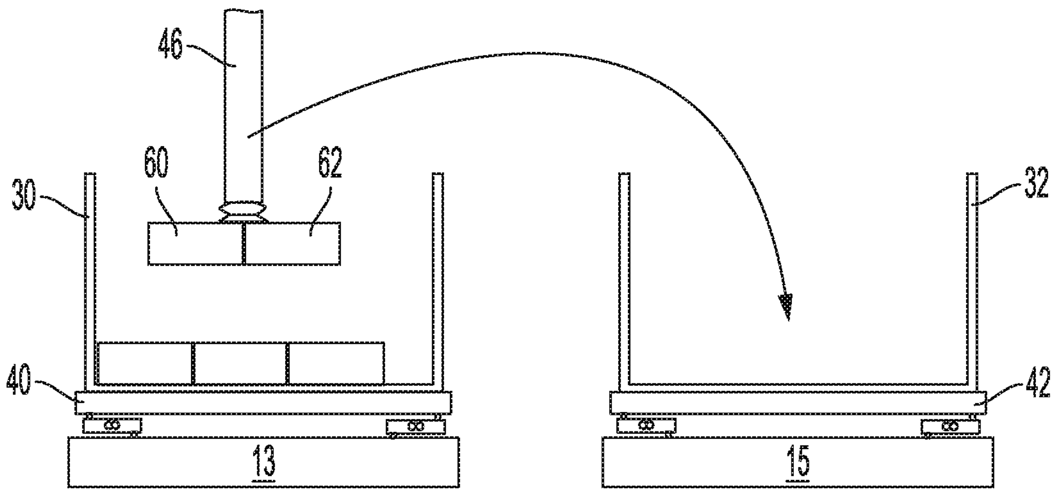
FIG. 7 shows an illustrative diagrammatic side view of an object being transferred from one container to another in accordance with an aspect of the present invention wherein a multi-pick has occurred.

FIG. 7 shows diagrammatically, a multi-pick wherein two objects 60, 62 are picked by the end-effector 46 from bin 30 intending to be placed into bin 32. If one object was intended to be picked, then the system should register a multi-pick when the conveyor section 40 is weighed following the pick. Prior to any drop of one object (e.g., 62 as shown in FIG. 6B), the system may first determine whether both objects are intended to be moved to bin 32. If so, they system may move to the pose-in-hand location, and if both objects are still being held by the gripper, the system may move both objects to the bin 32, readjusting the expected weight of the object to be the weight of both objects combined. If both objects are not intended to be moved to bin 32, the system may return both objects to the bin 30, or if the grasp attempt is not the first grasp attempt and more than a limited number of grasp attempts have been made (e.g., 3-5), then the system may discharge both objects into the floor-based catch bin 28.

In accordance with another run-time example involving a double pick, the system may seek to pick one object of mass 100 g. The system may measure the pick scale 0.4 seconds before impact, receive reading of one kg. The system may successfully pick the object and move it to the pose-in-hand location. As this motion is occurring, the system will periodically receive pick scale readings and fit a model to determine if more than one object has been picked. The system determines that during the retract pick, the pick scale registers 810 g. This is an indication that the system has picked 2 objects. The system may interrupt the pick and return the objects as discussed above.

FIG. 8 shows diagrammatically, the end-effector 48 grasping an intended object 66 that is not free to be lifted without inadvertently discharging one or more additional objects (e.g., 64, 68) from the bin 30 when the object 66 is lifted. If either of the objects 64, 68 falls outside of the bin 32 when the object 66 is lifted, then the discharged object(s) 64, 68 should fall to the weight sensing belted conveyor section 40 or the floor-based catch bin 28. If the object falls to the floor-based catch bin 28, the cameras should detect the motion as being motion not associated with motion of the end-effector as discussed above. The discharged object(s) 64, 68 may fall onto the weight sensing belted conveyor section 40. The presence of the object(s) 64, 68 on the conveyor section 40 may be detected by the upper camera system (cameras 56) as discussed above. In certain aspects, the system may continuously determine the weight of the conveyor section 40 during lifting. In this case, the system would confirm that more than one object (66) was lifted from the bin 32. If the total weight of the conveyor section 40 includes an object (64, 68), then the system will engage the upper camera system to locate the object (64, 68) on the conveyor section 40.

In accordance with a further run-time example, the system may use scale verification to verify that an object is displaced. The system may seek to pick one object of mass 100 g. The system will measure the pick scale 0.4 seconds before impact, receive reading of one kg. The system will successfully pick the object and move it to the pose-in-hand location. As this motion is occurring, the system will periodically receive pick scale readings and fit a model to determine if more than one object has been picked. Assuming a continuous check does not register a double pick, the system will reach the pose-in-hand node and receive a pick scale reading of 0.895 kg. The system confirms that it has removed 105 g from the pick tote, which is within threshold of believing the system has picked one 100 g object. The system will then take a place scale reading, which says it is at 200 g. The system will continue to place the object, but in this example for some reason, the object falls off the gripper. The system will take a pick scale reading, and see that it reads 895 g. This indicates that the object did not end up in the pick tote. The system will take a place scale reading and see it is still at 200 g. This indicates that the object did not end up in the placement bin. The object is therefore displaced and should be discovered by any of the perception units discussed above.

Figure 9A:
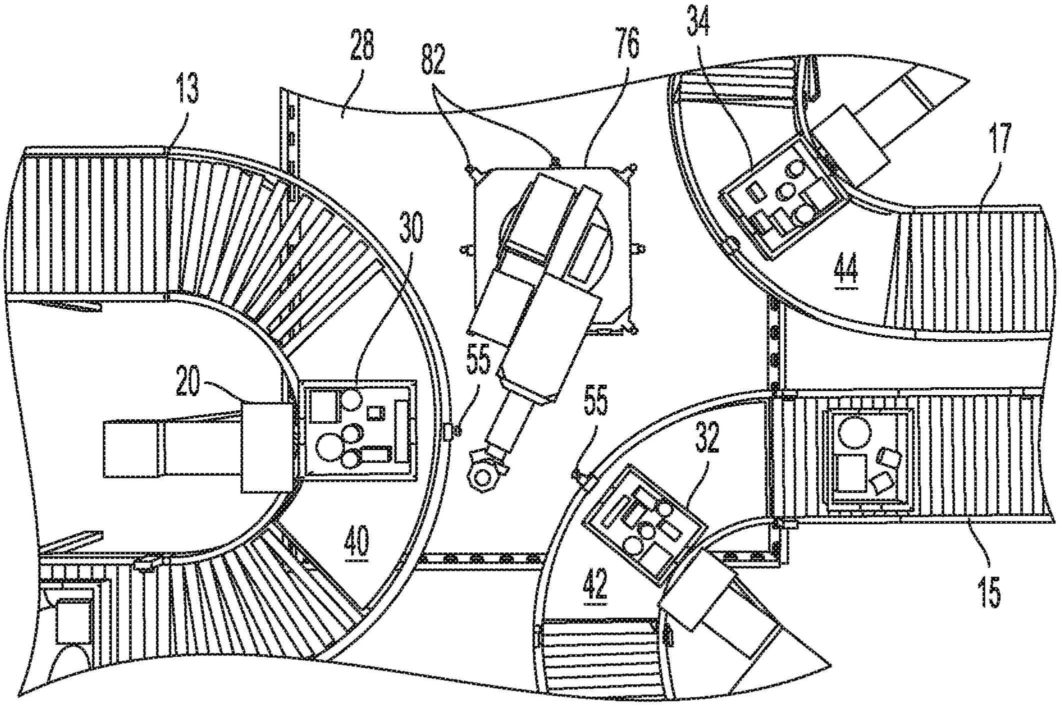
FIGS. 9A and 9B show illustrative diagrammatic plan views of the processing station of the system of FIG. 1, showing an object move operation (FIG. 9A), and showing an object having been dropped onto a weight sensing conveyor system (FIG. 9B)
Figure 9B:
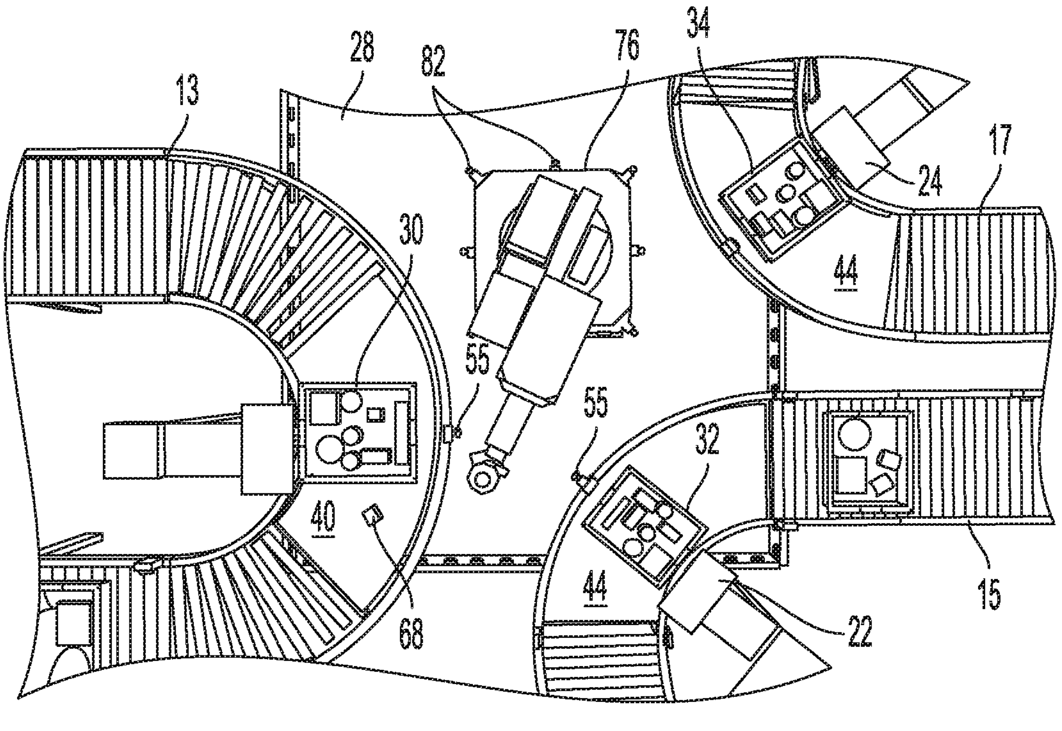

FIGS. 9A and 9B show top views of the system, showing the upper perception units 20, 22, 24 and the weight sensing belted conveyors 40, 42, 44. As shown in FIGS. 9A, 9B the upper perception units 20, 22, 24 have views of the weight-sensing belted conveyor sections 40, 42, 44 respectively that are unobstructed by the programmable motion device when the end-effector of the programmable motion device is at the pose-in-hand location. In accordance with further aspects, the system (knowing the position of the programmable motion device at all times) may track when no portion of the programmable motion device is above a conveyor section 40, 42, 44, and perform background subtraction during those times.

The perception units 20, 22, 24 may use RGB cameras and computer vision to detect whether a new object is on a conveyor section 40, 42, 44 (e.g., as shown in FIG. 9B). In particular, to inhibit detection from unexpected ambient light variation, several images before and after are taken ($R_{before}$, $G_{before}$, $B_{before}$, $R_{after}$, $G_{after}$, $B_{after}$). The $R_{before}$ and $R_{after}$ are the values of the red channel of each image pixel, the $G_{before}$ and $G_{after}$ are the values of the green channel of each image pixel, and the $B_{before}$ and $B_{after}$ are the values of the blue channel of each image pixel. A delta image is computed using the formula:

$$\text{delta}=\text{abs}(R_{before}-R_{after})+\text{abs}(G_{before}-G_{after})+\text{abs}(B_{before}-B_{after})$$

A pixel is considered changed if the delta exceeds a threshold. The computed difference between the images is cleared from noise using dilation and the cleaned difference image is searched for blobs inside the region of interest (e.g., the conveyor sections 40, 42, 44). Blobs are limited in area, circularity, convexity and inertia to protect from noise detection. If one or more eligible blobs are detected, it is considered that one or more objects were dropped to the region of interest between the before and after events. In accordance with further aspects, the belted conveyor section 40, 42, 44 may be formed on their outer surfaces thereof, of a color or reflective material that facilitates detecting and isolating any blobs that may represent one or more objects.

Figure 10A:
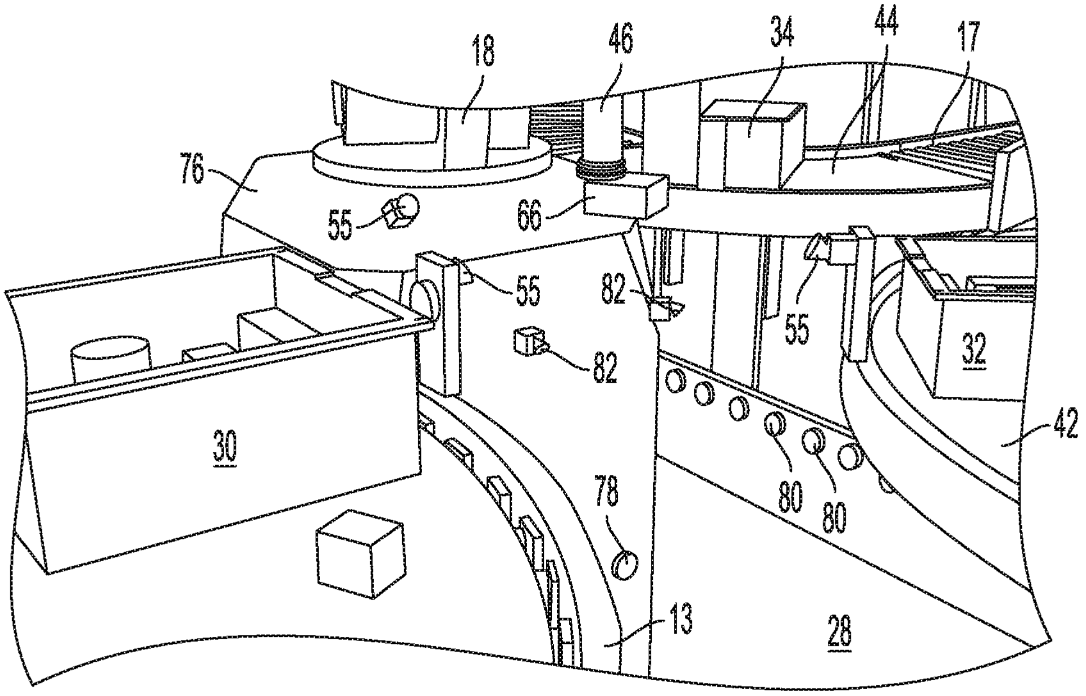
FIGS. 10A-10D show illustrative diagrammatic side views of the processing station of FIGS. 9A and 9B showing a side view of the object having been dropped (FIG. 10A), showing a multi-pick object being returned to the processing bin (FIG. 10B), showing the end effector returning to grasp the dropped object (FIG. 10C), and showing the end-effector grasping and moving the dropped object (FIG. 10D)
Figure 10B:
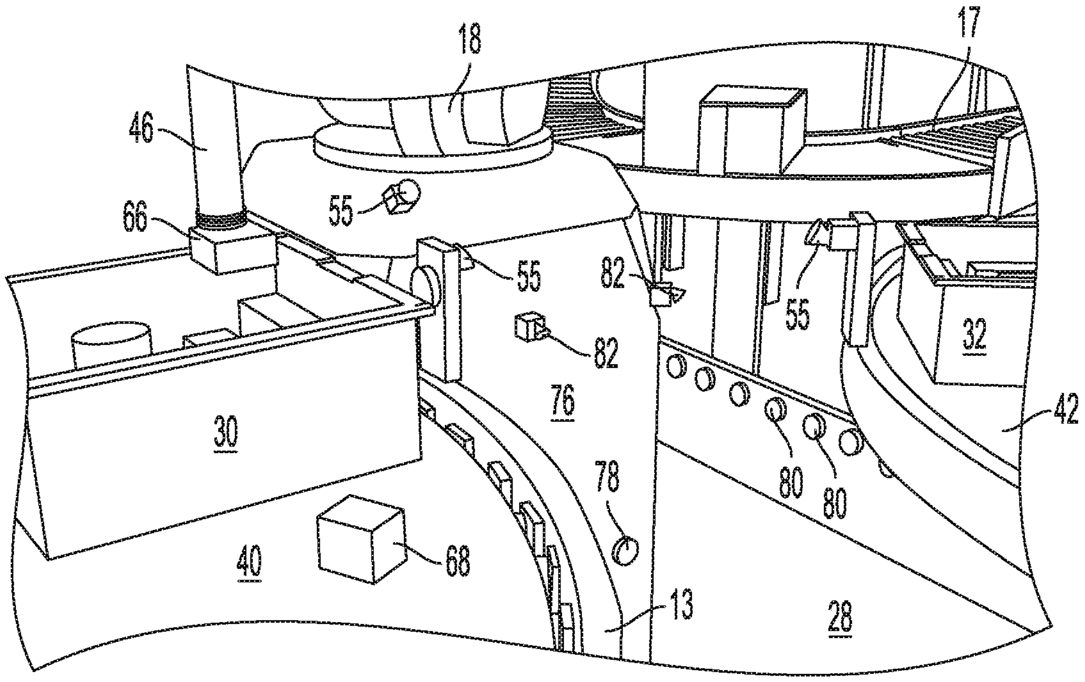
Figure 10C:
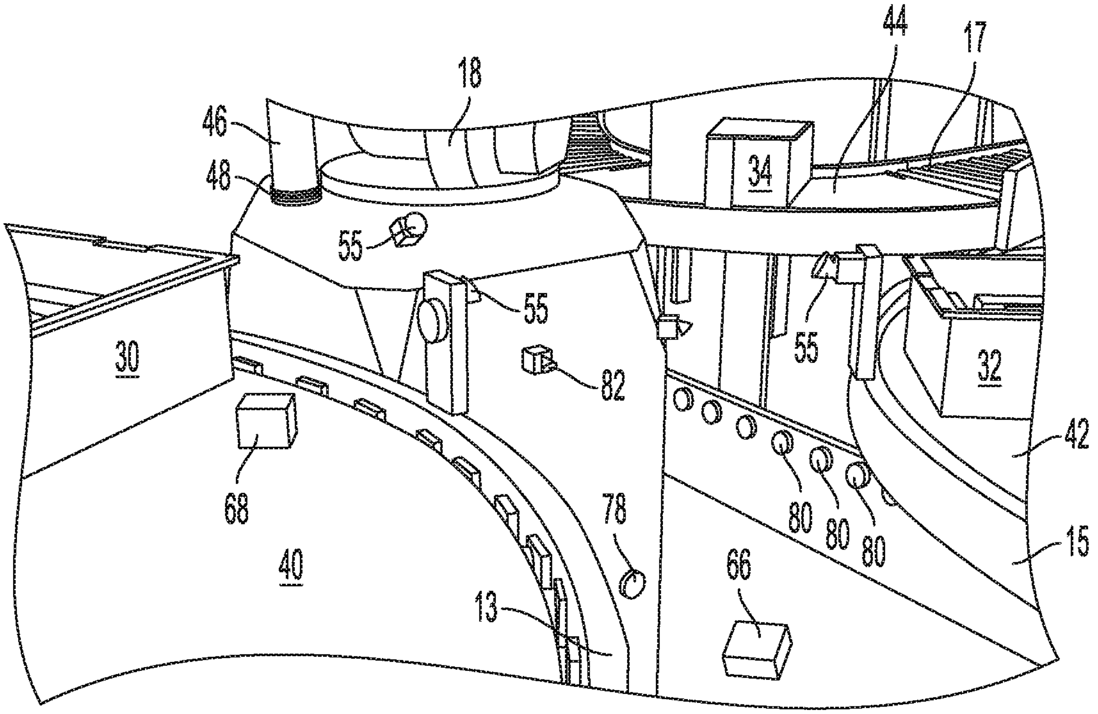
Figure 10D:
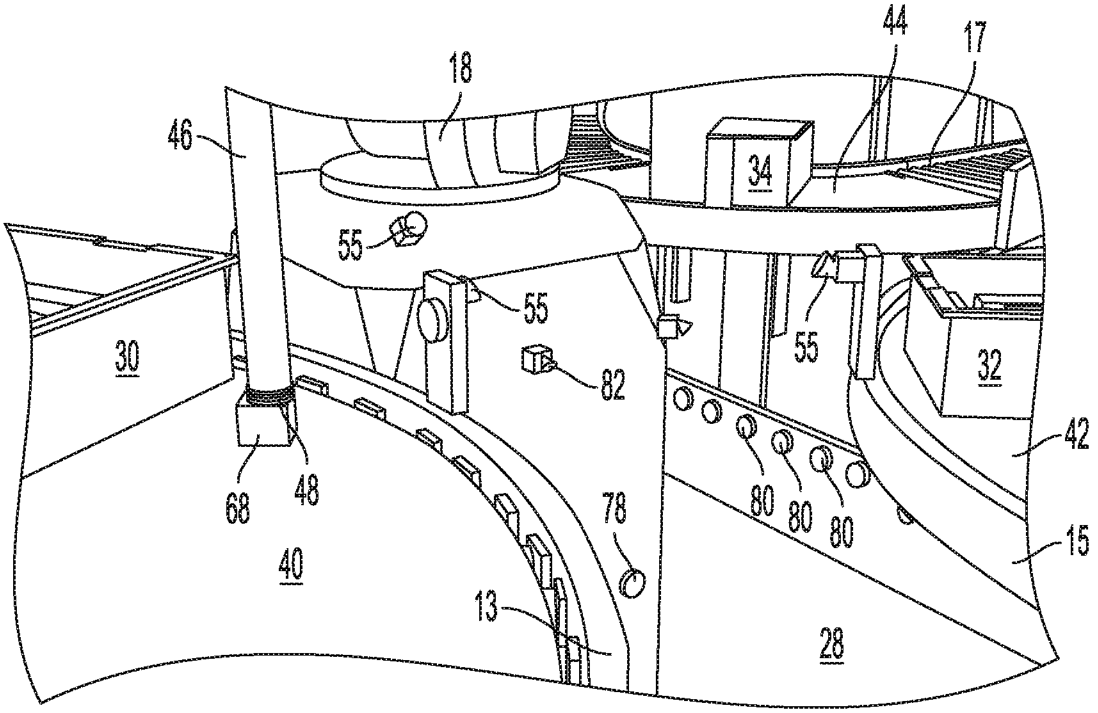

FIG. 10A shows an object 68 on the conveyor section 40 following lifting of the object 66 by the end-effector 46. Once the object has been detected on the conveyor section 40, the system may respond in a number of ways. One, if the identity of the object 68 is determinable, the system may move the selected object 66 to the destination location that was intended for object 66, and the end-effector may then return to grasp the object 68. Another possible response is that the end-effector 46 may be used to return the object 66 to the input bin 30 (as shown in FIG. 10B), and the end-effector may then position itself to grasp the object 68. The conveyor section 40 may also be moved forward and backward to facilitate the end-effector reaching the object 68. A further response is that the system may eject the object 66 from the end-effector 46 and may then position itself to grasp the object 68 at the same time that the conveyor section 40 is moved to position the object 68 closer to the end-effector (as shown in FIG. 10C). In any of the above cases, the end-effector is then used to grasp the object 68 from the conveyor section 40 (as shown in FIG. 10D) and either return it to the bin 30 or drop it into the floor-based catch bin 28. The conveyor section 40 may then be moved in the reverse direction to return the bin 30 to an unloading position.

Figure 11A:
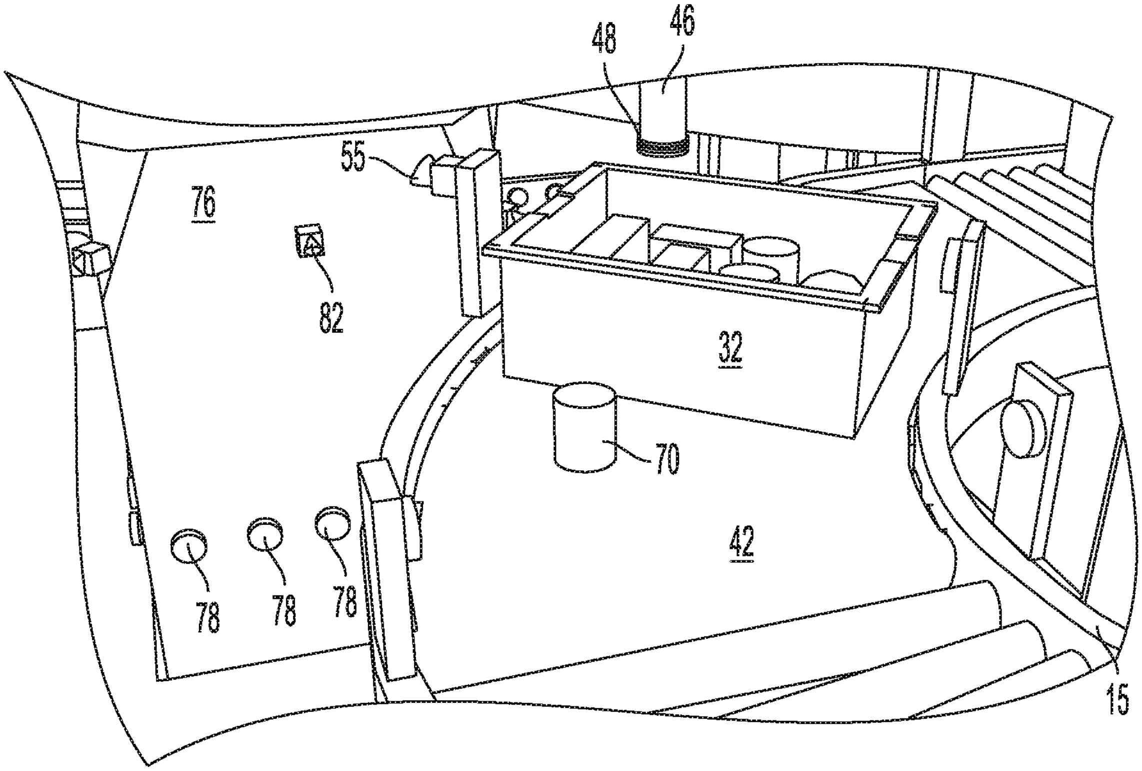
FIGS. 11A and 11B show illustrative diagrammatic views of a placement portion of the processing station of FIG. 1, showing a dropped on a placement conveyor section (FIG. 11A), and showing the end-effector grasping the dropped object (FIG. 11B)
Figure 11B:
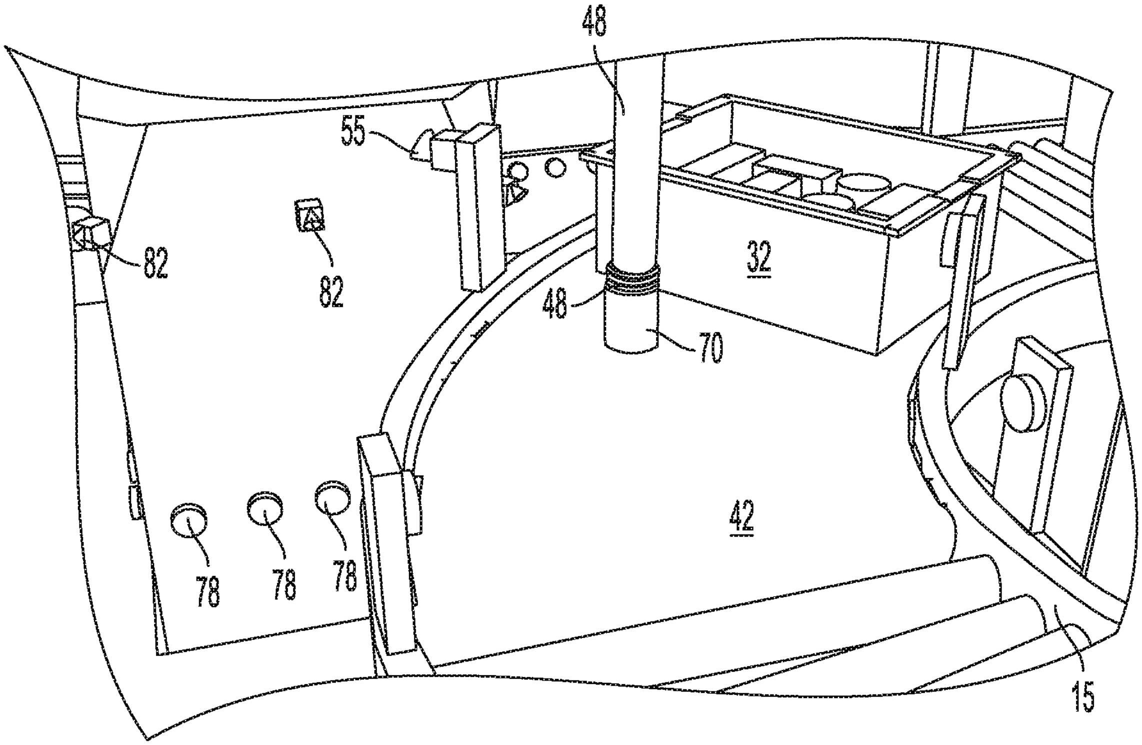

Dropped objects may also fall onto a weight sensing belted conveyor section at a destination location (e.g., 42, 44) and be detected by any of the upper cameras 56 or scanners 58 as discussed above. FIG. 11A shows an object 70 on the conveyor section 42. If another object is still on the end-effector 46, then the system may respond in any of the processes discussed above (deliver it to the bin 32, return it to the bin 30, or drop it into the floor-based catch bin 28). The conveyor section 42 may then be moved to accommodate grasping of the object 70 by the end-effector 46 as shown in FIG. 11B. The conveyor section 42 may then be moved in the reverse direction to return the bin 32 to a loading position.

Figure 12:
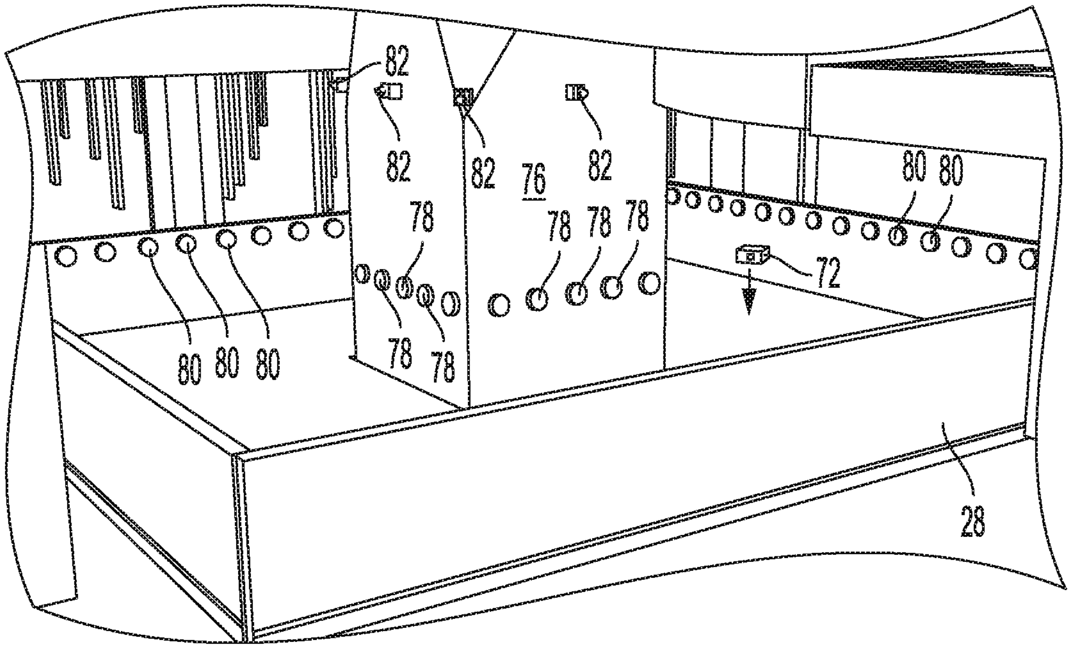
FIG. 12 shows an illustrative diagrammatic view of a lower portion of the processing station of the system of FIG. 1 showing a catch bin.
Figure 13:
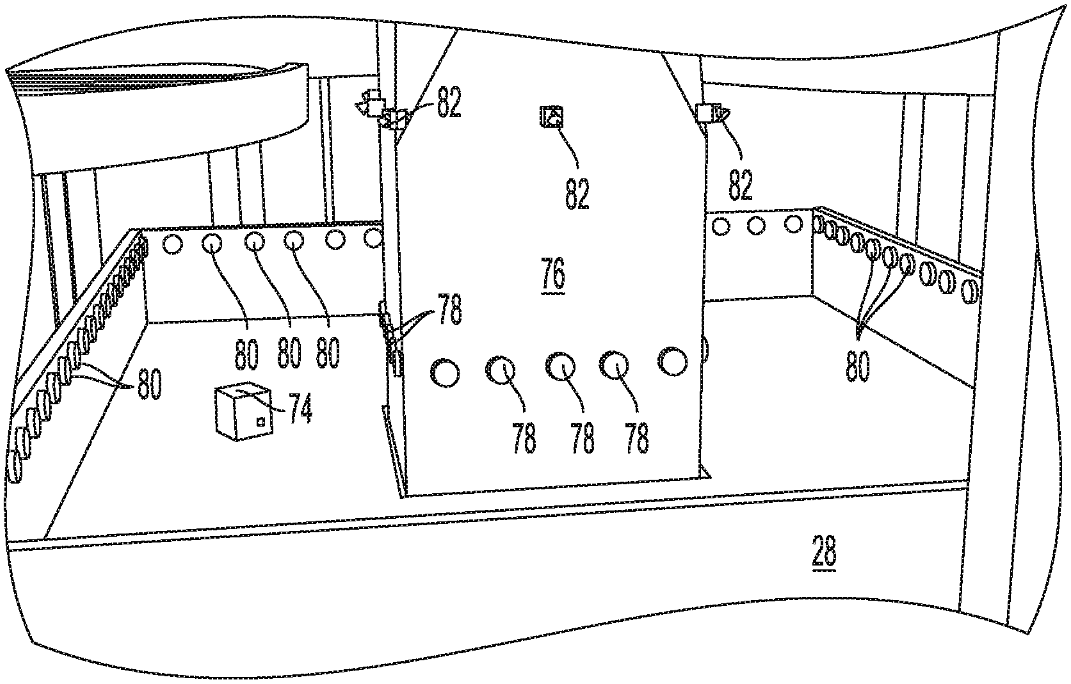
FIG. 13 shows an illustrative diagrammatic view of the catch bin of FIG. 12 with an object having dropped into the catch bin.

When objects are dropped into the floor-based catch bin 28, the system obtains the identity and quantity of the objects received by the floor-based catch bin 28. In particular, the system includes scanners 78 mounted on a robot support structure 76 as well as scanners 80 on the inner walls of the floor-based catch bin 28. These scanners detect each object falling (e.g., object 72 as shown in FIG. 12), determining both the identify of each object as it falls into the catch bin 28 (via identifying indicia such as bar code QR code, etc.) as well as determining a count of the number of objects that have fallen into the catch bin 28. Once each object comes to rest, lower camera detection systems 82 on the structure 76 confirm (e.g., through image recognition or volumetric analyses) that the identified received objects (e.g., 76) are indeed present in the catch bin 28 as shown in FIG. 13. Further cameras could also be positioned in the inner walls of the catch bin 28 below the scanners 80.

In accordance with various aspects therefore, the invention provides object processing systems that include a perception system for detecting movement of any of a plurality of objects that is not associated with movement of the end-effector of the programmable motion device, may provide a perception system for detecting whether any of the plurality of containers on the weight sensing conveyor section are not within the at least one input container on the weight sensing conveyor section, or may provide a perception system including at least one camera system and a plurality of scanning systems for detecting any identifying indicia on any of the plurality of objects that fall toward a portion of a floor of the object processing system as well as for detecting a number of any of the plurality of objects that fall toward the floor of the portion of the object processing system. These perception systems are provided by the scanners 56, 78, 80 and cameras 58, 82 discussed above in combination with the one or more computer processing systems 100 that are in communication with the programmable motion device 18 conveyors 13, 15, 17 and conveyor sections 40, 42, 44.

Those skilled in the art will appreciate that numerous modifications and variations may be made to the above disclosed embodiments without departing from the spirit and scope of the present invention.

What is claimed is:

1. An object processing system comprising:

an input area for receiving an input container that contains a plurality of objects to be processed, the input area including a weight sensing conveyor section on which the input container is received;

an output area including a plurality of destination containers for receiving any of the plurality of objects;

a programmable motion device proximate the input area and the output area, the programmable motion device including an end-effector for grasping a selected object of the plurality of objects from the input container and placing the selected object into any of the plurality of destination containers at the output area; and a perception system including any of a camera system or a scanning system, wherein the weight sensing conveyor section is weighed before and after the end-effector grasps the selected object to determine a weight delta, the weight delta being compared against an expected weight of the selected object to verify that the selected object is displaced from the input container, wherein the perception system is configured to detect whether any of the plurality of objects, other than the selected object, is dropped or displaced outside of the input container on the weight sensing conveyor section of the input area in response to the weight delta being within a tolerance of the expected weight of the selected object, and wherein the programmable motion device is configured to retrieve any object detected by the perception system outside of the destination container from the weight sensing conveyor section of the input area.

2. The object processing system as claimed in claim 1, wherein the weight sensing conveyor section of the input area includes at least a portion of a roller conveyor system.

3. The object processing system as claimed in claim 1, wherein the weight sensing conveyor section of the input area includes at least a portion of a belted conveyor system.

4. The object processing system as claimed in claim 1, wherein the perception system is further configured to detect any identifying indicia on any of the plurality of objects that fall toward a portion of a floor of the object processing system.

5. The object processing system as claimed in claim 1, wherein the perception system is further configured to detect a number of any of the plurality of objects that fall toward a floor of the portion of the object processing system.

6. An object processing system comprising:

an input area for receiving a plurality of objects to be processed, the plurality of objects being provided within at least one input container;

an output area including a plurality of destination containers for receiving any of the plurality of objects, the output area including an output weight sensing conveyor section on which a destination container is provided;

a programmable motion device proximate the input area and the output area, the programmable motion device including an end-effector for grasping a selected object of the plurality of objects from the at least one input container and attempting to place the selected object into the destination container on the output weight sensing conveyor section of the output area; and a perception system including any of a camera system or a scanning system, wherein the output weight sensing conveyor section is weighed before and after the end-effector attempts to place the selected object into the destination container to determine a weight delta, the weight delta being compared against an expected weight of the selected object, wherein the perception system is configured to detect whether the selected object or any other object is dropped or displaced outside of the destination container on the output weight sensing conveyor section of the output area in response to the weight delta being within a tolerance of the expected weight of the selected object, and wherein the programmable motion device is configured to retrieve the selected object or the other object detected outside of the destination container from the output weight sensing conveyor section of the output area.

7. The object processing system as claimed in claim 6, wherein at least one of the input weight sensing conveyor section and the output weight sensing conveyor section includes at least a portion of a roller conveyor system.

8. The object processing system as claimed in claim 6, wherein at least one of the input weight sensing conveyor section and the output weight sensing conveyor section includes at least a portion of a belted conveyor system.

9. The object processing system as claimed in claim 6, wherein the perception system is further configured to detect any identifying indicia on any of the plurality of objects that fall toward a portion of a floor of the object processing system.

10. The object processing system as claimed in claim 6, wherein the perception system is further configured to detect a number of any of the plurality of objects that fall toward the floor of the portion of the object processing system.

11. An object processing system comprising:

an input area for receiving a plurality of objects to be processed;

an output area including a plurality of destination containers for receiving any of the plurality of objects;

a programmable motion device proximate the input area and the output area, the programmable motion device including an end-effector for grasping any of the plurality of objects for delivery to any of the plurality of destination containers; and a floor-based catch bin for receiving any of the plurality of objects dropped by the end-effector of the programmable motion device prior to delivery to any of the plurality of destination containers, the floor-catch bin including at least one camera system and a plurality of scanning systems for detecting any identifying indicia on any of the plurality of objects that fall toward the floor-based catch bin, and for detecting a number of any of the plurality of objects that fall toward the floor-based catch bin.

12. The object processing system as claimed in claim 11, wherein the plurality of objects are contained in at least one input container, the object processing system further comprising a perception system that detects whether any of the plurality of objects that is not associated with the end-effector of the programmable motion device are located on the input area outside of the input container.

13. The object processing system as claimed in claim 12, wherein the input area includes a conveyor section, and wherein the perception system detects whether any of the plurality of objects that is not associated with the end-effector of the programmable motion device is located on the conveyor section of the input area outside of the input container.

14. The object processing system as claimed in claim 13, wherein the conveyor section of the input area includes an input weight sensing conveyor section.

15. The object processing system as claimed in claim 14, wherein the output area includes an output weight sensing conveyor section.

16. The object processing system as claimed in claim 15, wherein at least one of the input weight sensing conveyor section and the output weight sensing conveyor section includes at least a portion of a roller conveyor system.

17. The object processing system as claimed in claim 15, wherein at least one of the input weight sensing conveyor section and the output weight sensing conveyor section includes at least a portion of a belted conveyor system.

18. The object processing system as claimed in claim 15, wherein the perception system further detects whether any of the plurality of objects that is not associated with the end-effector of the programmable motion device is located on the output weight sensing conveyor section outside of the plurality of destination containers.

19. A method of processing objects comprising:

providing a plurality of objects in an input container on a first weight sensing conveyor section;

obtaining a first weight from the first weight sensing conveyor section before a selected object is grasped from the input container;

grasping the selected object of the plurality of objects from the input container for movement to a destination container by the end-effector of the programmable motion device;

obtaining a second weight from the first weight sensing conveyor section after the selected object is grasped from the input container;

determining a weight delta between the first weight and the second weight obtained from the first weight sensing conveyor section;

verifying that the selected object is displaced from the input container by comparing the weight delta obtained from the first weight sensing conveyor section against an expected weight of the selected object;

detecting by a perception system whether any of the plurality of objects other than the selected object are dropped or displaced on the first weight sensing conveyor section outside of the input container in response to the weight delta being within a tolerance of the expected weight of the selected object, the perception system including any of a camera system or a scanning system; and retrieving any object, detected by the perception system outside of the input container, from the first weight sensing conveyor section by the end-effector of the programmable motion device.

20. The method as claimed in claim 19, wherein the first weight sensing conveyor section includes a belted conveyor section.

21. The method as claimed in claim 19, wherein the method further includes detecting by the perception system any identifying indicia on any of the plurality of objects that fall toward a portion of a floor and further detecting a number of any of the plurality of objects that fall toward the floor.

22. The method as claimed in claim 19, wherein the method further includes detecting by the perception system at least one characteristic regarding the selected object as the selected object continues to move through a pose-in-hand location.

23. The method as claimed in claim 19, wherein the method further comprises:

providing a destination container on a second weight sensing conveyor section of an output area;

obtaining a first weight from the second weight sensing conveyor section before attempting to place the selected object into the destination container;

attempting to place the selected object by an end-effector of a programmable motion device into the destination container;

obtaining a second weight from the second weight sensing conveyor section after attempting to place the selected object into the destination container;

determining a weight delta between the first weight and the second weight obtained from the second weight sensing conveyor section;

comparing the weight delta obtained from the second weight sensing conveyor section against the expected weight of the selected object;

detecting by a perception system whether the selected object or any other object is dropped or displaced on the second weight sensing conveyor section outside of the destination container in response to determining that the weight delta is within the tolerance of the expected weight of the selected object; and retrieving the selected object or the other object, detected by the perception system outside of the destination container, from the second weight sensing conveyor section by the end-effector of the programmable motion device.

* * * * *